(12) United States Patent
Edens et al.

(10) Patent No.: US 12,448,142 B1
(45) Date of Patent: Oct. 21, 2025

(54) ELECTRIC PROPULSION SYSTEM FOR A FLIGHT VEHICLE

(71) Applicant: General Electric Company, Evendale, OH (US)

(72) Inventors: Scott G Edens, Milford, OH (US); Jeffrey D. Rambo, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/918,235

(22) Filed: Oct. 17, 2024

(51) Int. Cl.
*B64D 33/10* (2006.01)
*B64D 27/34* (2024.01)

(52) U.S. Cl.
CPC ............ *B64D 33/10* (2013.01); *B64D 27/34* (2024.01)

(58) Field of Classification Search
CPC .............................. B64D 33/10; B64D 27/34
See application file for complete search history.

(56) References Cited

U.S. PATENT DOCUMENTS

| | | |
|---|---|---|
| 4,796,836 A | 1/1989 | Buchelt |
| 5,035,377 A | 7/1991 | Buchelt |
| 8,695,324 B2 | 4/2014 | Giffin et al. |
| 8,821,123 B2 | 9/2014 | Camci et al. |
| 10,710,735 B2 | 7/2020 | Murrow |
| 10,737,797 B2 | 8/2020 | Murrow et al. |
| 10,822,101 B2 | 11/2020 | Murrow et al. |
| 11,040,779 B2 | 6/2021 | Murrow et al. |
| 11,053,014 B2 | 7/2021 | Murrow et al. |
| 11,084,595 B2 | 8/2021 | Murrow |
| 11,117,675 B2 | 9/2021 | Murrow et al. |
| 11,117,676 B2 | 9/2021 | Murrow et al. |
| 11,124,306 B2 | 9/2021 | Murrow et al. |
| 11,124,307 B2 | 9/2021 | Murrow et al. |
| 11,124,308 B2 | 9/2021 | Murrow et al. |
| 11,511,876 B2 | 11/2022 | Mueller et al. |
| 11,851,197 B2 | 12/2023 | Yajima et al. |
| 2014/0158816 A1* | 6/2014 | DeLorean ............ B64D 27/355 244/12.4 |
| 2020/0140102 A1* | 5/2020 | Marcel .................... H02K 21/16 |
| 2021/0107664 A1* | 4/2021 | Rabbi .................... B64D 27/34 |

(Continued)

FOREIGN PATENT DOCUMENTS

| | | |
|---|---|---|
| FR | 3127269 A1 | 3/2023 |
| FR | 3130896 A1 | 6/2023 |

(Continued)

*Primary Examiner* — Rodney A Bonnette
(74) *Attorney, Agent, or Firm* — Venable LLP; Edward A. Kmett; Michele V. Frank

(57) ABSTRACT

An electric propulsion system includes a fan rotor assembly having a first fan portion and a second fan portion. A fan cowling defines a first flow passage and a second flow passage. An electric drive mechanism drives the fan rotor assembly. An electric drive cooling system includes a liquid coolant that provides cooling to at least a part of the electric drive mechanism, and a heat exchanger through which the liquid coolant flows is arranged within the second flow passage. The first fan portion provides a first flow of air through the first flow passage to provide at least one of a lifting force or a thrust force to the electric propulsion system, and the second fan portion provides a second flow of air through the second flow passage to provide a flow of cooling air therethrough that is in thermal communication with the heat exchanger.

20 Claims, 14 Drawing Sheets

(56) References Cited

U.S. PATENT DOCUMENTS

| | | | |
|---|---|---|---|
| 2021/0222624 A1* | 7/2021 | Wiedenhoefer | F28D 7/0075 |
| 2021/0323688 A1* | 10/2021 | Yajima | H02K 9/06 |
| 2023/0391445 A1* | 12/2023 | Manohar | B64D 15/00 |

FOREIGN PATENT DOCUMENTS

| | | | |
|---|---|---|---|
| FR | 3130897 A1 | 6/2023 | |
| FR | 3133367 A1 | 9/2023 | |
| FR | 3133368 A1 | 9/2023 | |

\* cited by examiner

ELECTRIC PROPULSION SYSTEM FOR A FLIGHT VEHICLE

TECHNICAL FIELD

The present disclosure relates to an electric propulsion system for a flight vehicle.

BACKGROUND

In some flight vehicles, such as a drone, one or more fans or propellers may generally be implemented to provide lift or to provide directional thrust to the flight vehicle. The fans or propellors implemented in drones may generally be electrically driven by an electric motor that drives a central shaft of the fan or the propellor.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
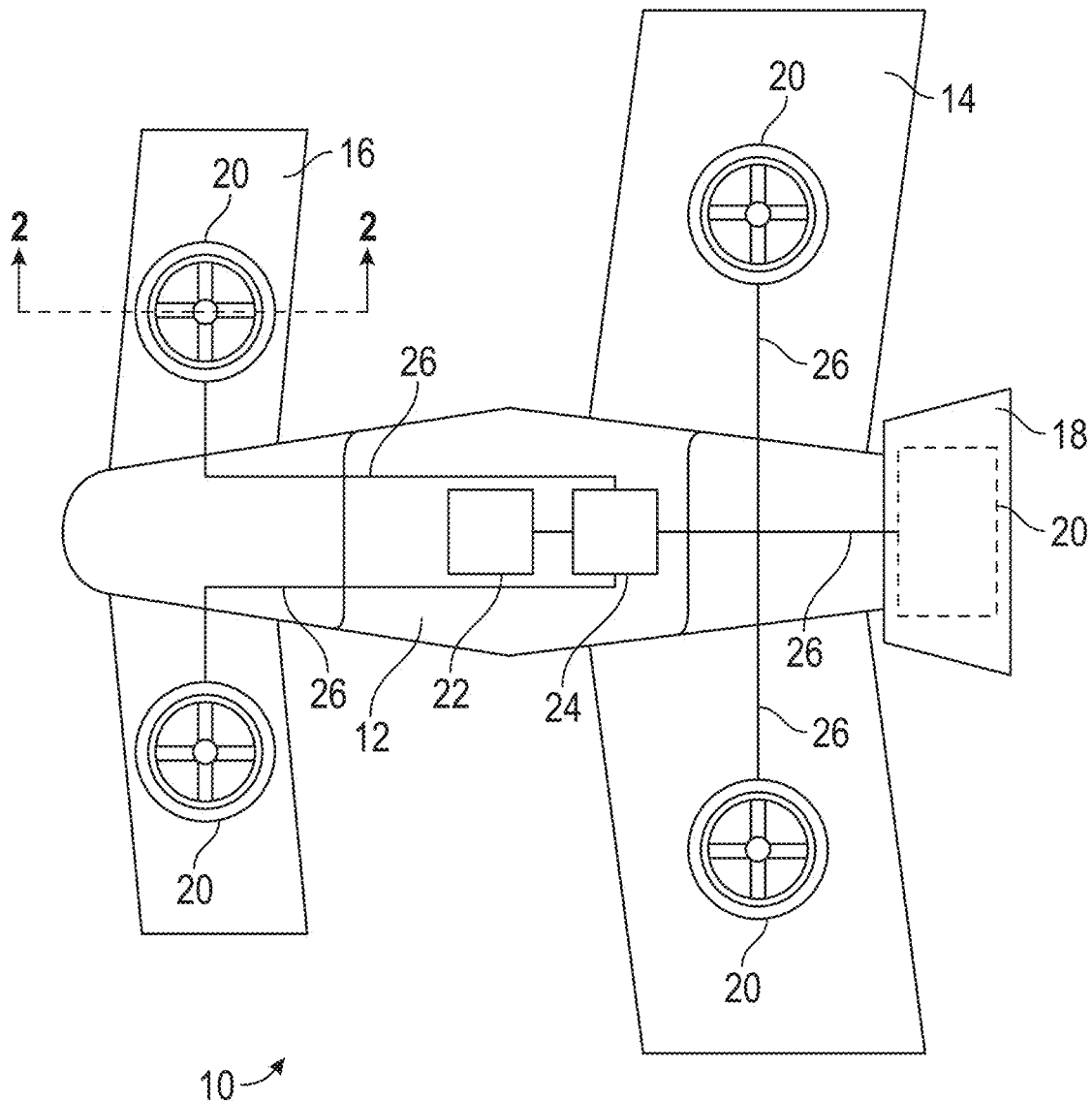
FIG. 1 is a top plan view of an exemplary flight vehicle, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments are discussed in detail below. While specific embodiments are discussed, this is done for illustration purposes only. A person skilled in the relevant art will recognize that other components and configurations may be used without departing from the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to a relative side of an element and may be used interchangeably with the terms "upstream" and "downstream," respectively.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

In some flight vehicles, such as a drone, one or more fans or propellers may generally be implemented to provide lift or to provide directional thrust to the flight vehicle. The fans or propellors implemented in drones may generally be electrically driven by an electric motor that drives a central shaft of the fan or the propellor. Another configuration, according to the present disclosure, implements an electric rim-driven fan to provide lift and/or propulsion. With an electric rim-driven fan, magnets may be implemented on a rotor of a fan assembly, and a stator may be implemented in a fan cowling. Electrical charges are applied to the stator to generate a rotating magnetic field that drives the magnets connected to the fan rotor, thereby causing the fan to rotate and to provide the lift and/or the propulsion. The stator generally includes a core and windings (or coils), which, when the electrical charges are applied, generates heat in the stator.

To address the foregoing, the present disclosure implements a fan rotor assembly having a first fan portion for providing a first flow of air through a first flow passage for providing lift/thrust, and a second fan portion arranged to provide a second flow of air through a second flow passage. An electric drive cooling system is implemented to provide cooling to the stator, and the cooling system includes a heat exchanger that is arranged within the second flow passage. Thus, the arrangement of the present disclosure provides for a more compact and simplified system, while providing cooling to the stator coils.

Referring now to the drawings, FIG. 1 is a top plan view of an exemplary flight vehicle 10, according to an aspect of the present disclosure. As shown in FIG. 1, the flight vehicle 10 includes a main body 12, a main wing 14, a secondary wing 16, and a tail 18. The secondary wing 16 may be in the form of a canard that functions as an elevational control surface for the flight vehicle 10. The flight vehicle 10 also includes at least one electric propulsion system 20. For example, a plurality of electric propulsion systems 20 may be included in the main wing 14, and a plurality of the electric propulsion systems 20 may also be included within the secondary wing 16. Each electric propulsion system 20 in the main wing 14 and in the secondary wing 16 may be arranged to provide a lifting force to the flight vehicle 10. In addition, one or more electric propulsion systems 20 may also be included within the tail 18. The one or more electric propulsion systems 20 within the tail may be arranged to provide propulsive thrust force or directional thrust force to the flight vehicle 10, as opposed to providing lift. Alternatively, each respective electric propulsion system 20 within the main wing 14 or within the secondary wing 16 may be controlled to tilt in any one or more directions so as to provide both a lifting force and a thrust force. The tilt of each electric propulsion system 20 may be controlled, for example, by a swashplate-type of control arrangement (not shown) utilized in helicopters to control tilt of the rotor system of the helicopter so as to provide both lift and directional thrust.

The flight vehicle 10 also includes a central power supply 22, such as a battery, and a controller 24. The central power supply 22 and the controller 24 may be arranged within the main body 12 of the flight vehicle 10. The central power supply 22 provides electric power to the controller 24, and the controller 24 controls a supply of the electric power to each of the plurality of electric propulsion systems 20. The controller 24 may communicate with each of the plurality of electric propulsion systems 20 via a series of communication channels 26. Each of the communication channels 26 may include, for example, an electric power distribution line (not shown) through which a portion of the electric power from the central power supply 22 is provided to the respective electric propulsion system 20. In addition, each of the communication channels 26 may also include a command signal communication line (not shown) that provides operational control command signals from the controller 24 to each respective electric propulsion system 20, and that may also provide operational feedback signals from the respective electric propulsion system 20 to the controller 24. Alternatively, rather than including the central power supply 22 for providing power to each respective electric propulsion system 20, additional power supplies may be included to provide electric power to respective ones of the electric propulsion systems 20.

Figure 2:
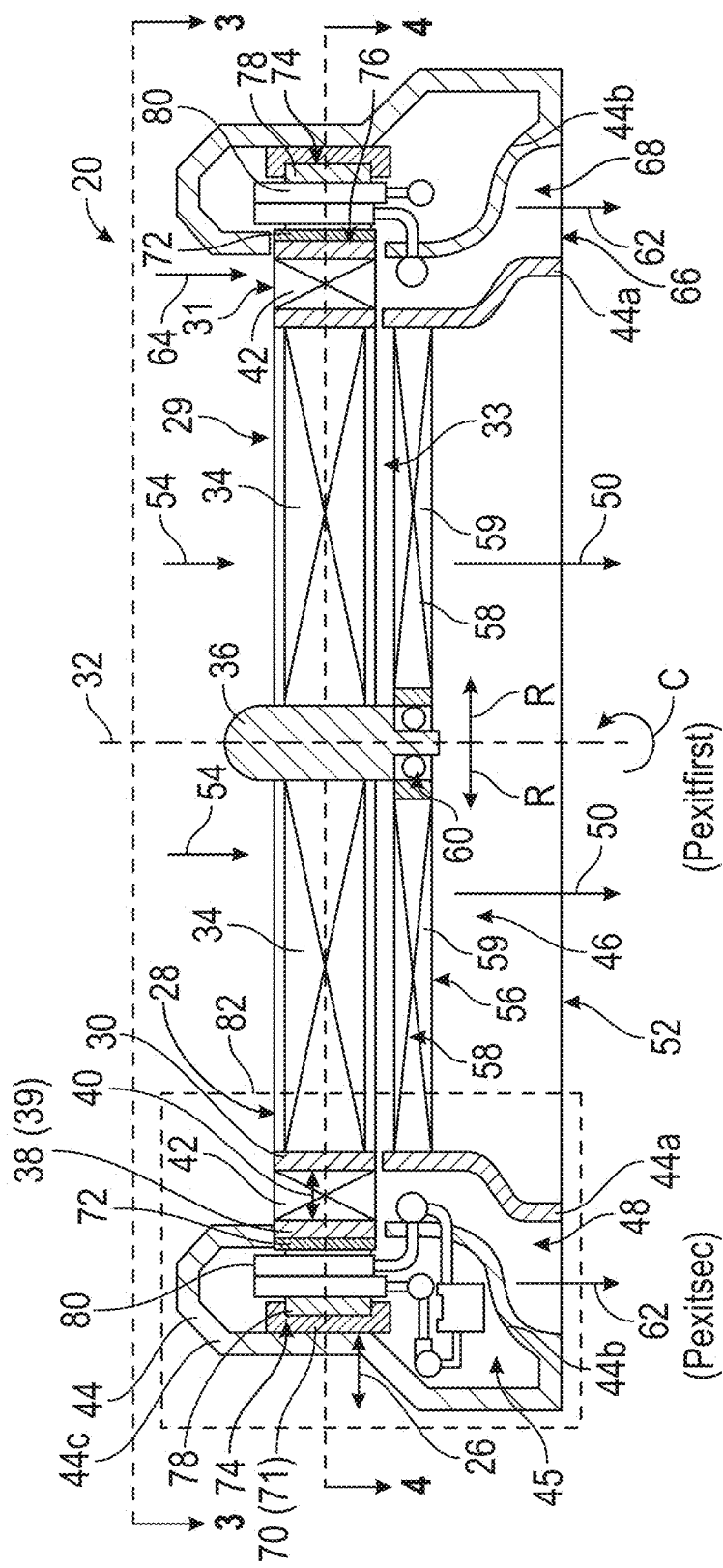
FIG. 2 is a cross-sectional side view of the electric propulsion system 20, taken at plane 2-2 of FIG. 1, according to an aspect of the present disclosure.
Figure 3:
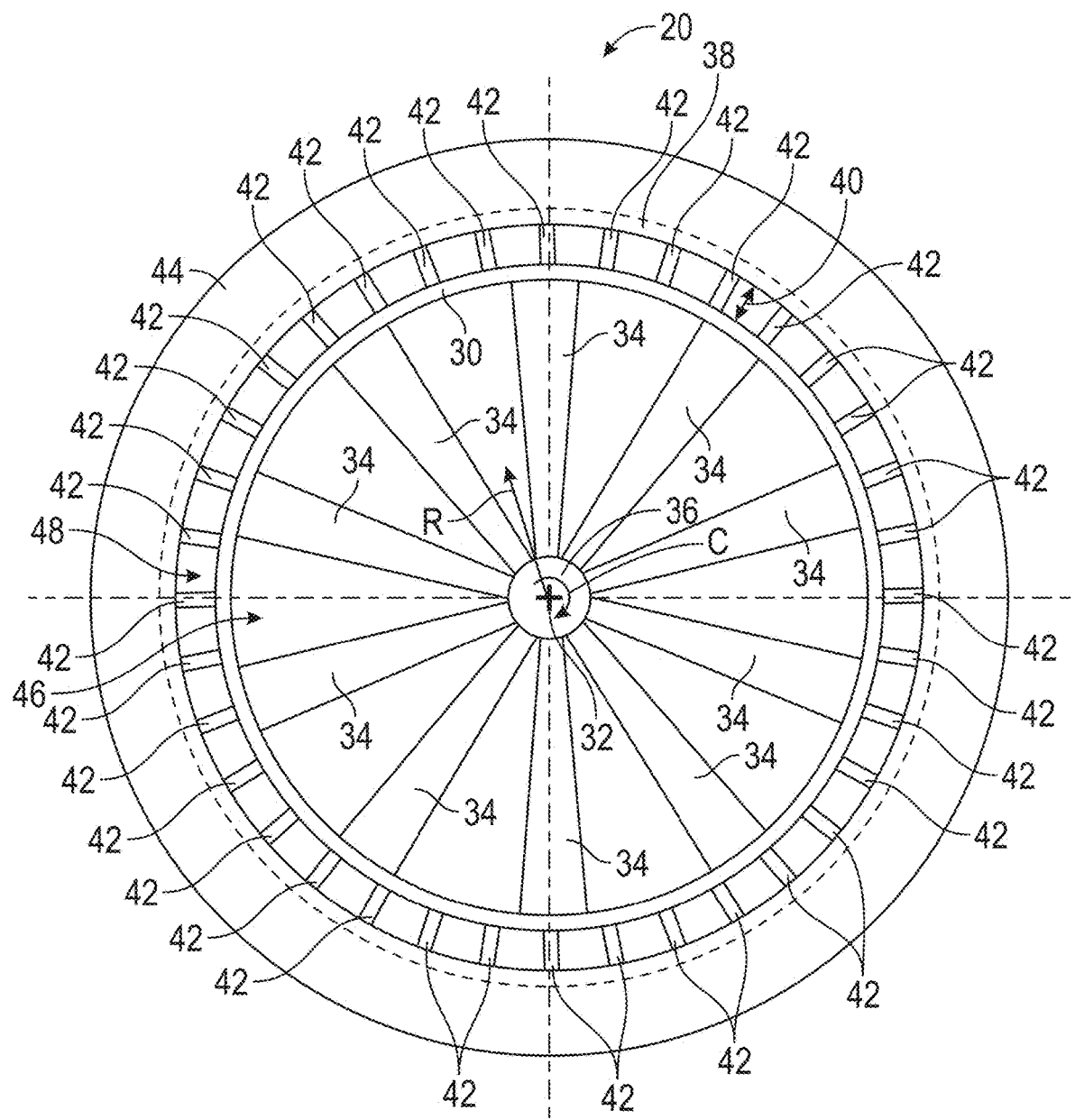
FIG. 3 is a top view of the electric propulsion system of FIG. 2, taken at plane 3-3 of FIG. 2, according to an aspect of the present disclosure.

FIG. 2 is a cross-sectional side view of the electric propulsion system 20, taken at plane 2-2 of FIG. 1, according to an aspect of the present disclosure. FIG. 3 is a top view of the electric propulsion system 20 taken at plane 3-3 of FIG. 2, according to an aspect of the present disclosure. Referring collectively to FIG. 2 and to FIG. 3, the electric propulsion system 20 includes a fan rotor assembly 28 defining a fan centerline axis 32 and having a first fan portion 29 and a second fan portion 31. The fan rotor assembly 28 is a single rotor assembly 33. The first fan portion 29 includes a central shaft 36, an inner tip-fan wall 30 extending circumferentially about the fan centerline axis 32, and a plurality of first fan blades 34 extending from the central shaft 36 to the inner tip-fan wall 30. The second fan portion 31 is arranged radially outward of the first fan portion 29, with respect to the fan centerline axis 32, and the second fan portion 31 includes the inner tip-fan wall 30, an outer tip-fan wall 38, and a plurality of second fan blades 42 extending from the inner tip-fan wall 30 to the outer tip-fan wall 38. The plurality of first fan blades 34 are circumferentially spaced apart about the fan centerline axis 32, and the plurality of second fan blades 42 are also circumferentially spaced apart about the fan centerline axis 32.

The electric propulsion system 20 also includes a fan cowling 44 that includes a first fan cowling wall 44a, a second fan cowling wall 44b, and a shroud 44c. The first fan cowling wall 44a extends circumferentially about the fan centerline axis 32 and defines a first flow passage 46 therewithin. The second fan cowling wall 44b also extends circumferentially about the fan centerline axis 32, and a second flow passage 48 is defined between the first fan cowling wall 44a and the second fan cowling wall 44b. The shroud 44c extends circumferentially about the fan centerline axis 32 and a cavity 45 is defined between the shroud 44c and the second fan cowling wall 44b. As will be explained below, various component elements of the electric propulsion system 20 may be housed within the cavity 45. A support structure 56 is arranged to support the fan rotor assembly 28 and includes a plurality of circumferentially spaced apart struts 58 (two shown in FIG. 2). The struts 58 may comprise stator vanes 59 that are connected to the first fan cowling wall 44a and are connected to a bearing member 60 that is connected to the central shaft 36. The support structure 56, together with the bearing member 60, allows the fan rotor assembly 28 to rotate about the fan centerline axis 32. The stator vanes 59 provide for de-swirling of an airflow passing through the stator vanes 59.

The first fan cowling wall 44a defines the first flow passage 46 radially inward of the inner tip-fan wall 30 for providing a first flow of air 50 to flow through the first fan blades 34 and through an outlet end 52 of the first flow passage 46. More specifically, as will be described below, in operation of the electric propulsion system 20, the fan rotor assembly 28 is driven to rotate about the fan centerline axis 32 such that the first fan blades 34 propel an inlet airflow 54 to generate the first flow of air 50 within the first flow passage 46 to provide a lifting force or a thrust force to the electric propulsion system 20.

The second fan cowling wall 44b and the first fan cowling wall 44a define the second flow passage 48 between the inner tip-fan wall 30 and the outer tip-fan wall 38. The second flow passage 48 is arranged as a diffuser flow passage 68 that includes an outlet end 66 that is longitudinally aligned, with respect to the fan centerline axis 32, with the outlet end 52 of the first flow passage 46. In operation, an inlet airflow 64 flows through, and is propelled by, the second fan blades 42 to generate a second flow of air 62 to flow through the outlet end 66 of the diffuser flow passage 68. As will be explained in more detail below, the second flow of air 62 is mainly provided as a cooling airflow rather than being a lift or a thrust airflow, although some lifting force or thrust force may be provided by the second flow of air 62.

Figure 4:
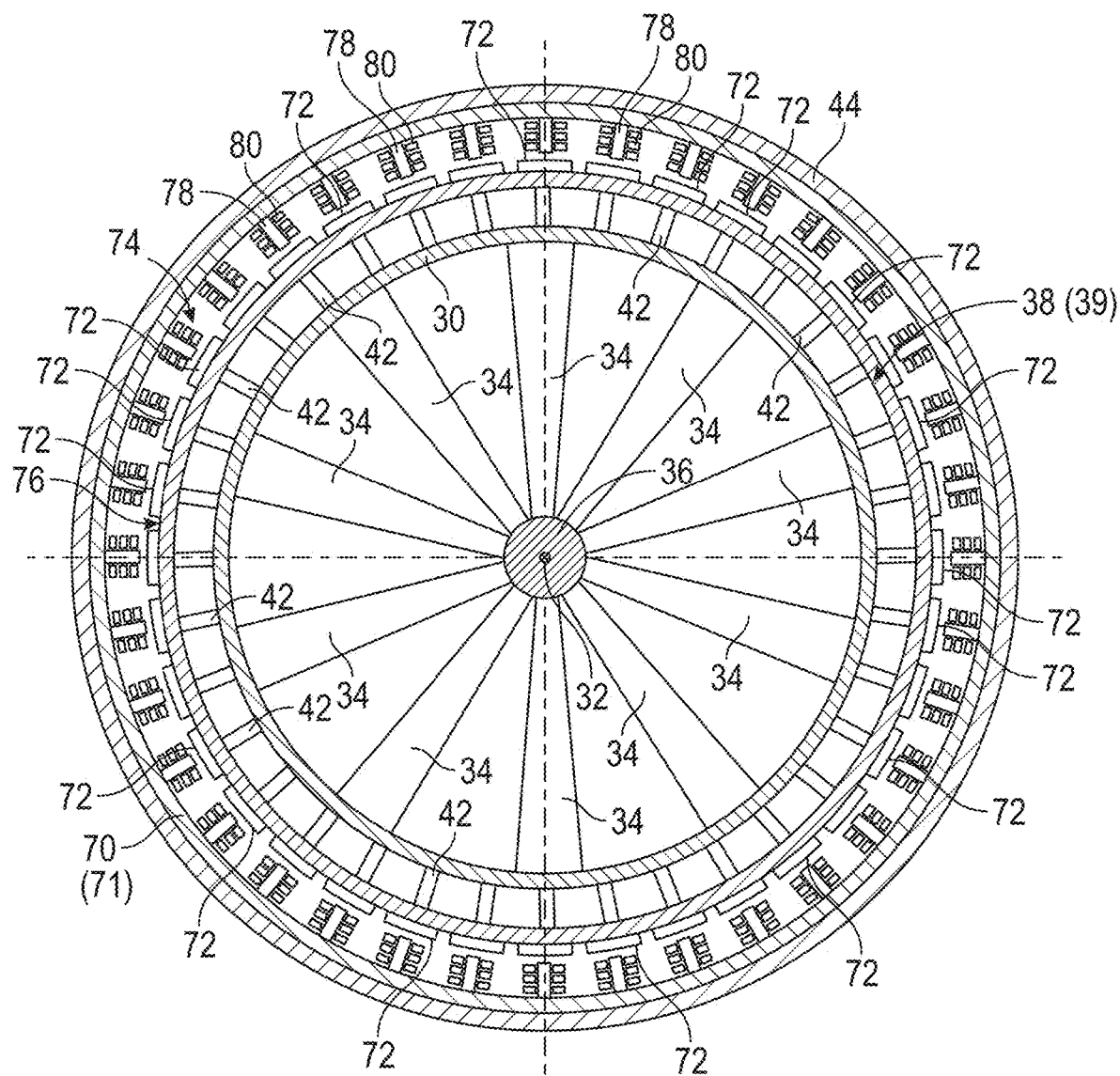
FIG. 4 is a cross-sectional view of the electric propulsion system of FIG. 2, taken at plane 4-4 of FIG. 2, according to an aspect of the present disclosure.

FIG. 4 is a cross-sectional view of the electric propulsion system 20, taken at plane 4-4 of FIG. 2, according to an aspect of the present disclosure. Referring collectively to FIG. 4 and to FIG. 2, the electric propulsion system 20 also includes an electric drive mechanism 70 that is arranged to drive the fan rotor assembly 28 about the fan centerline axis 32. The electric drive mechanism 70 communicates with the controller 24 (FIG. 1) via the communication channel 26 to receive electrical power and control command signals, as was described above for FIG. 1. The electric drive mechanism 70 is an electric motor that, in the present aspect of FIG. 2 to FIG. 4, is generally a permanent magnet type electric drive system 71. However, as will be described below, the electric motor may instead be a wound field type electric drive system. In FIG. 4, the electric drive mechanism 70, as the permanent magnet direct current motor, includes a plurality of magnets 72 that are arranged on a radially outer side 76 of the outer tip-fan wall 38. The outer tip-fan wall 38 may also be referred to as a rotor 39 that, as will be described below, is driven to rotate about the fan centerline axis 32. The plurality of magnets 72 are circumferentially spaced apart, generally equally spaced apart, about the radially outer side 76 of the outer tip-fan wall 38.

The electric drive mechanism 70 also includes a stator assembly 74 that has a plurality of cores 78 and a plurality of coils 80 wound about each respective core 78. As will be described in more detail below, for the present aspect, each of the plurality of coils 80 is a hollow conductive wire with a coolant flow passage therewithin through which a coolant flows to providing cooling to the respective coil 80. However, in another aspect described below, the coils need not be a hollow conductive wire, but may be a solid conductive wire instead. Electric power is provided to the stator assembly 74 to generate successive magnetic fields by each of the respective core 78 and coil 80, thereby causing the magnets 72 to drive the fan rotor assembly 28 to rotate. The driving of the fan rotor assembly 28 generates the first flow of air 50 to provide a main lifting force (or directional thrust force) to the electric propulsion system 20. In addition, the driving of the fan rotor assembly 28 generates the second flow of air 62 to flow through the second flow passage 48.

Figure 5:
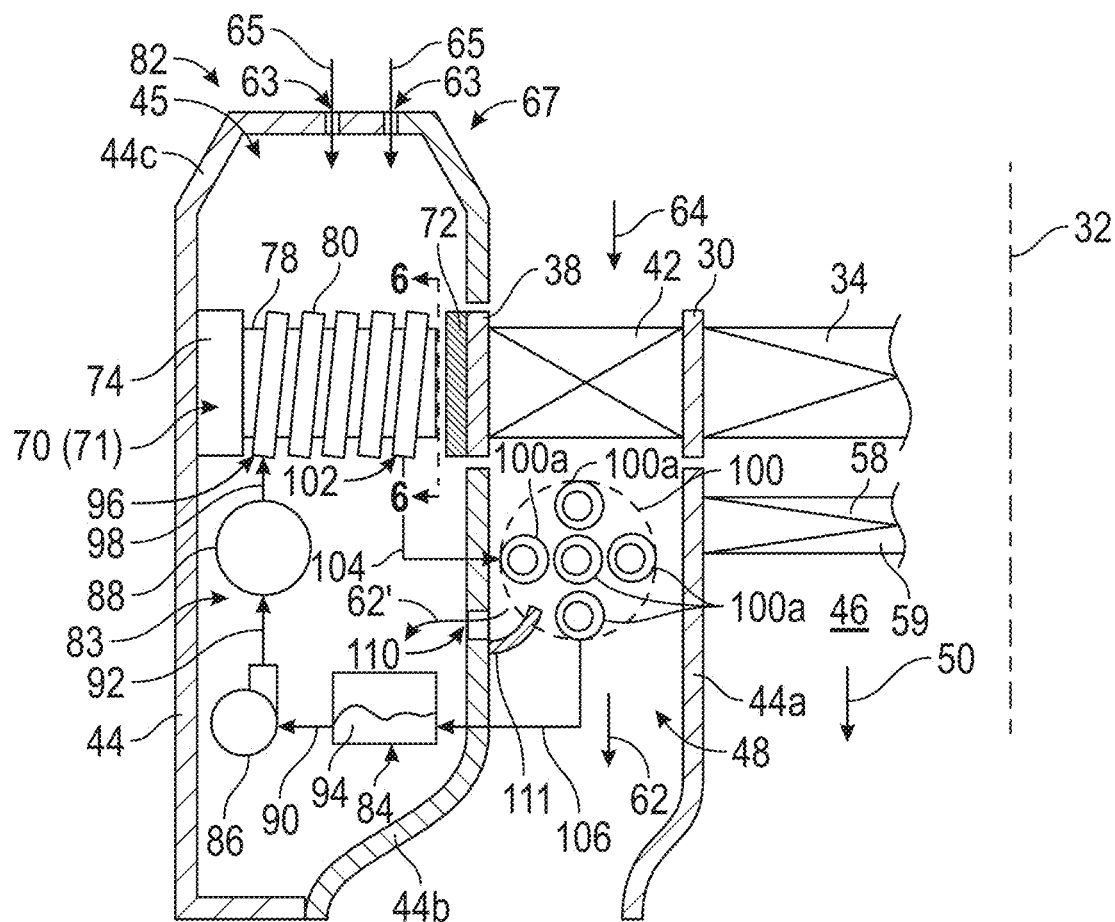
FIG. 5 is an enlarged schematic view of a portion of the electric propulsion system of FIG. 2, taken at detail view 82 of FIG. 2, according to an aspect of the present disclosure.

FIG. 5 is an enlarged schematic view of a portion of the electric propulsion system 20, taken at detail view 82 of FIG. 2, according to an aspect of the present disclosure. As shown in FIG. 5, the electric propulsion system 20 includes an electric drive cooling system 83 provided, at least in part, within the cavity 45 of the fan cowling 44. As will be described below, the electric drive cooling system 83 is arranged to provide cooling to at least a part of the electric drive mechanism 70. In the FIG. 5 aspect, the electric drive cooling system 83 is shown to include a coolant reservoir 84, a coolant pump 86, and a coolant manifold 88. The coolant manifold 88 may be, for example, a tubular-shaped manifold and may extend circumferentially about the fan centerline axis 32. The coolant pump 86 is in fluid communication with the coolant reservoir 84 via a coolant line 90, and the coolant pump 86 is in fluid communication with the coolant manifold 88 via a coolant line 92. In this manner, the coolant pump 86 can be operated to urge a liquid coolant 94 to flow from the coolant reservoir 84 and to provide a flow of the liquid coolant 94 to the coolant manifold 88. A first end 96 of each respective coil 80 is in fluid communication with the coolant manifold 88 via a respective coolant inlet line 98.

The electric drive cooling system 83 also includes a heat exchanger 100 arranged within the second flow passage 48. The heat exchanger 100 is in fluid communication with a second end 102 of each respective coil 80 via a coolant outlet line 104. The heat exchanger 100 may constitute any heat exchanger configuration in which the liquid coolant 94 can flow therethrough to provide cooling to the liquid coolant 94. In FIG. 5, the heat exchanger 100 may constitute one or more heat exchanger tubes 100a. For example, the heat exchanger 100 may constitute a single heat exchanger tube 100a that extends circumferentially about the fan centerline axis 32 multiple times so as to form a multi-tube coil (e.g., one continuous tube wrapped around the fan centerline axis 32 within the second flow passage 48 five times to form a five-tube coil). The heat exchanger 100 is also in fluid communication with the coolant reservoir 84 via a coolant return line 106. Thus, in operation, the coolant pump 86 is operated to urge the liquid coolant 94 from the coolant reservoir 84 to flow into the coolant manifold 88, and the output pressure from the pump causes the liquid coolant 94 to flow from the coolant manifold 88 through each of the respective ones of the plurality of coils 80. The liquid coolant 94 then flows from each respective coil 80 into the heat exchanger 100, where the liquid coolant 94 is cooled before flowing back into the coolant reservoir 84 via the coolant return line 106. The liquid coolant 94 may be any type of liquid used for cooling purposes, including water or ethylene glycol.

In operation of the electric propulsion system 20, the fan rotor assembly 28 is driven by the electric drive mechanism 70 so that the second fan blades 42 provide the second flow of air 62 through the second flow passage 48. The second flow of air 62 flows through and around the heat exchanger 100 such that the second flow of air 62 and the heat exchanger 100 are in thermal communication with each other to cool the heat exchanger 100, thereby cooling the liquid coolant 94 flowing through the heat exchanger 100. As a result, the liquid coolant 94 flowing through each coil 80 of the stator assembly 74 provides cooling to the stator assembly 74, and the cooling of the liquid coolant 94 flowing through the heat exchanger 100 can lower the temperature of the liquid coolant 94 flowing through the electric drive cooling system 83.

Figure 7:
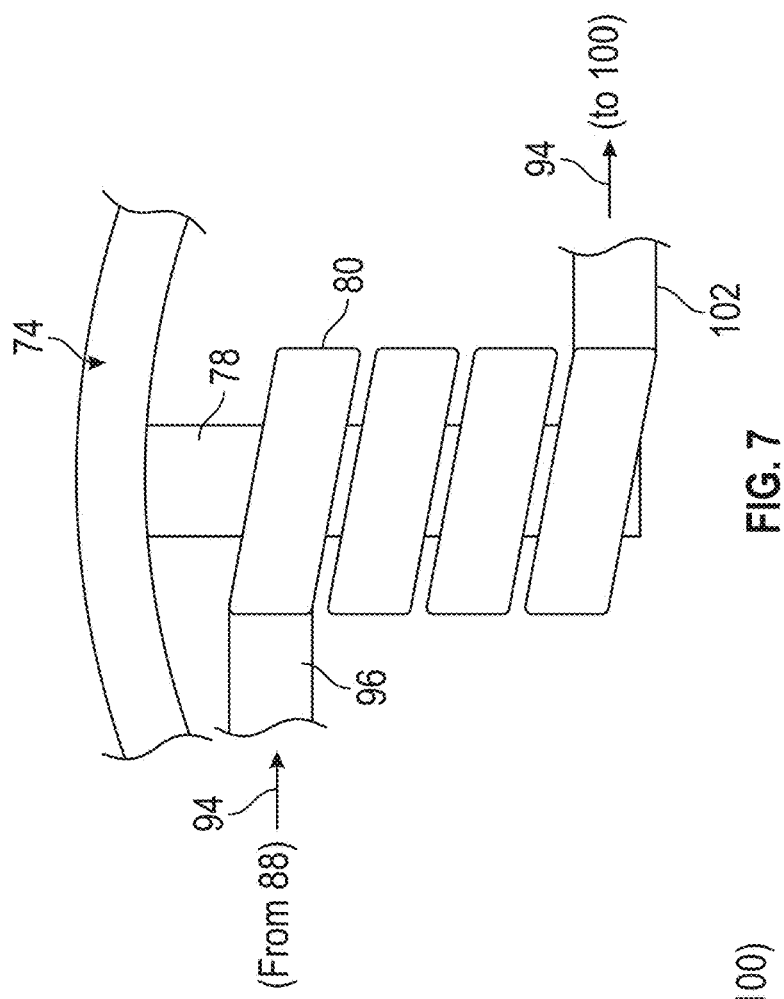
FIG. 7 is a top view of the stator assembly of FIG. 6, taken at view 7-7 of FIG. 6, according to an aspect of the present disclosure.
Figure 6:
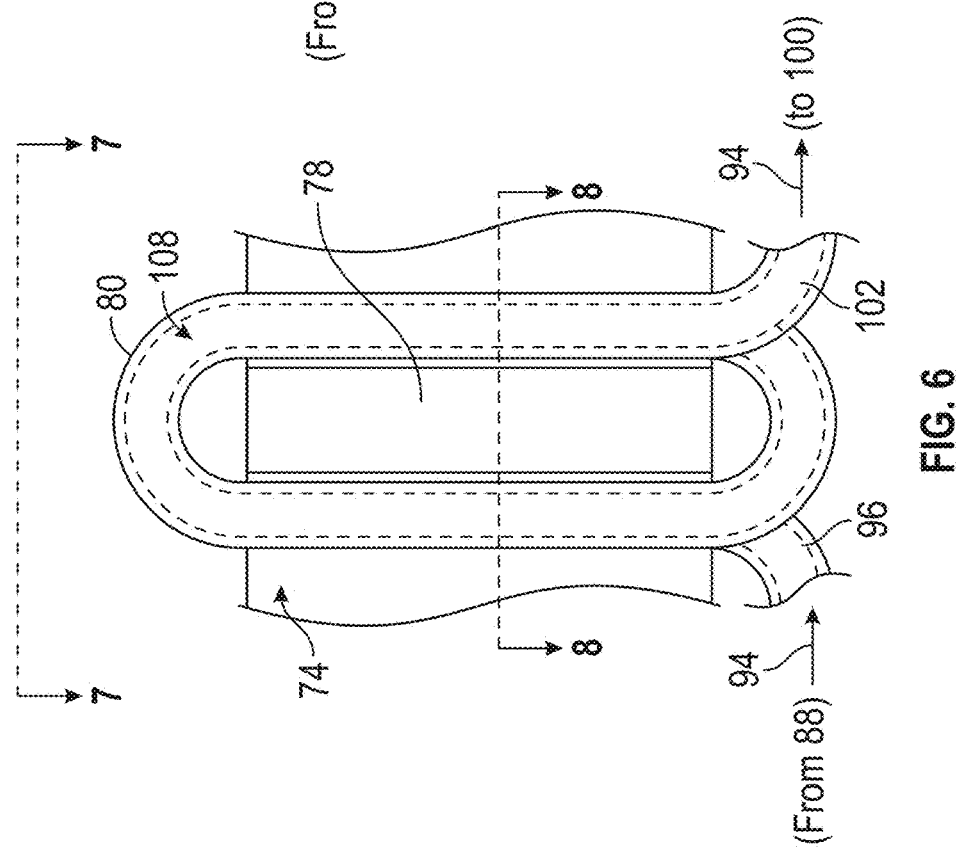
FIG. 6 is a front view of the stator assembly taken at view 6-6 of FIG. 5, according to an aspect of the present disclosure.
Figure 8:
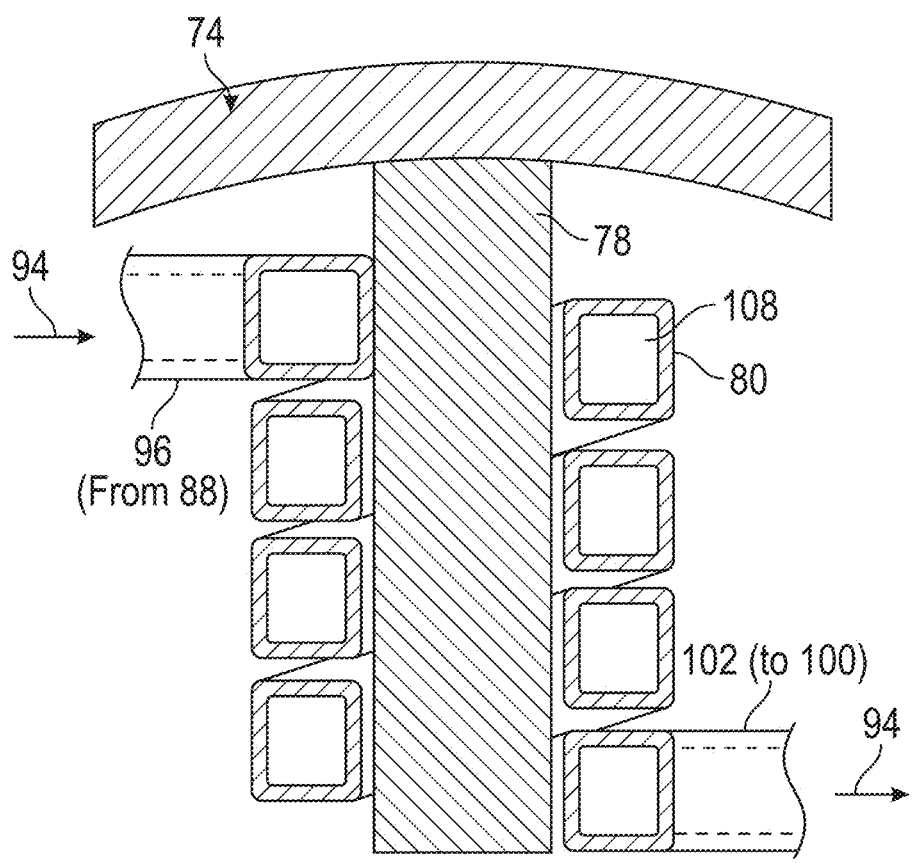
FIG. 8 is a cross-sectional view through the stator assembly of FIG. 6, taken at plane 8-8 of FIG. 6, according to an aspect of the present disclosure.

FIG. 6 is a front view of the stator assembly 74 taken at view 6-6 of FIG. 5, according to an aspect of the present disclosure. FIG. 7 is a top view of the stator assembly 74 of FIG. 6, taken at view 7-7 of FIG. 6, according to an aspect of the present disclosure. FIG. 8 is a cross-sectional view through the stator assembly 74 of FIG. 6, taken at plane 8-8 of FIG. 6, according to an aspect of the present disclosure. Referring collectively to FIG. 6, to FIG. 7, and to FIG. 8, the coil 80 is shown as being wrapped around the core 78 in a helical manner. In FIG. 6, shown with dashed lines, and in FIG. 8, the coil 80 is shown to include a coolant flow passage 108 extending therethrough such that the liquid coolant 94 flows through the coil 80 from the coolant manifold 88 to the heat exchanger 100, as was described above.

Referring back to FIG. 5, the fan cowling 44 may also include one or more cooling passages 110 arranged through the second fan cowling wall 44b. Each cooling passage 110 may be, for example, a rectangular-shaped opening extending in the circumferential direction with respect to the fan centerline axis 32, and extending through the second fan cowling wall 44b, with each rectangular-shaped opening being circumferentially spaced apart about the fan centerline axis 32. Each cooling passage 110 provides a cooling airflow 62' as a portion of the second flow of air 62 therethrough into the cavity 45 to provide cooling to the electric drive mechanism 70 and to the electric drive cooling system 83 within the cavity 45. For example, the cooling airflow 62' may provide cooling to components within the cavity 45 of the fan cowling 44 (e.g., to the coolant pump 86, to the coolant reservoir 84, to the coolant manifold 88, and to the stator assembly 74). In addition, each cooling passage 110 may include a deflector 111 arranged on a downstream side of the cooling passage 110 to deflect a portion of the second flow of air 62 through the cooling passage 110. Further, the shroud 44c may include a plurality of cooling airflow openings 63 through a first end 67 of the shroud 44c, where each cooling airflow opening 63 provides a flow of air 65 therethrough into the cavity 45. As a result, further cooling may be provided to the electric drive mechanism 70 within the cavity 45.

In the foregoing arrangement, the second flow of air 62 through the second flow passage 48, while primarily being provided as a cooling airflow for implementation with the heat exchanger 100, may have an effect on the lifting (or thrust) force provided by the first flow of air 50 through the first flow passage 46. To address potential detrimental effects that the second flow of air 62 may have on the lifting (or thrust) force from the first flow of air 50, various design factors are taken into consideration so that an exit pressure ($P_{exitsec}$) of the second flow of air 62 exiting from the outlet end 66 (FIG. 2) of the second flow passage 48, and an exit pressure ($P_{exitfirst}$) of the first flow of air 50 at the outlet end 52 (FIG. 2) of the first flow passage 46 are equivalent (or approximately equivalent) to one another. For example, one factor may be the design of the second fan blades 42 (e.g., the number of the second fan blades 42, a chord length of the second fan blades 42, an amount of camber or a shape of the camber of the second fan blades 42, or spanwise twist implemented in the second fan blades 42, or a span of the second fan blades 42). Another factor may be the design of the first fan blades 34 (e.g., the number of the first fan blades 34, a chord length of the first fan blades 34, an amount of camber or a shape of the camber of the first fan blades 34, or spanwise twist implemented in the first fan blades 34, or a span of the first fan blades 34). Another factor that may be considered is the rotational speed of the fan rotor assembly 28 to be provided by the electric drive mechanism 70. Yet another factor that may be considered is the shape and length of the diffuser flow passage 68 of the second flow passage 48. Still yet another factor that may be considered is the size and the shape of the heat exchanger 100 within the second flow passage 48. Each of these factors, again, may be considered in the design to achieve the equivalent (or approximately equivalent) exit pressures between exit pressure ($P_{exitfirst}$) of the first flow passage 46 and the exit pressure ($P_{exitsec}$) of the second flow passage 48. Of course, additional design factors affecting the exit pressure at the outlet end 52 of the first flow passage 46 and the exit pressure at the outlet end 66 of the second flow passage 48 may also be considered, and the present disclosure is not limited to the foregoing design factors.

Figure 9:
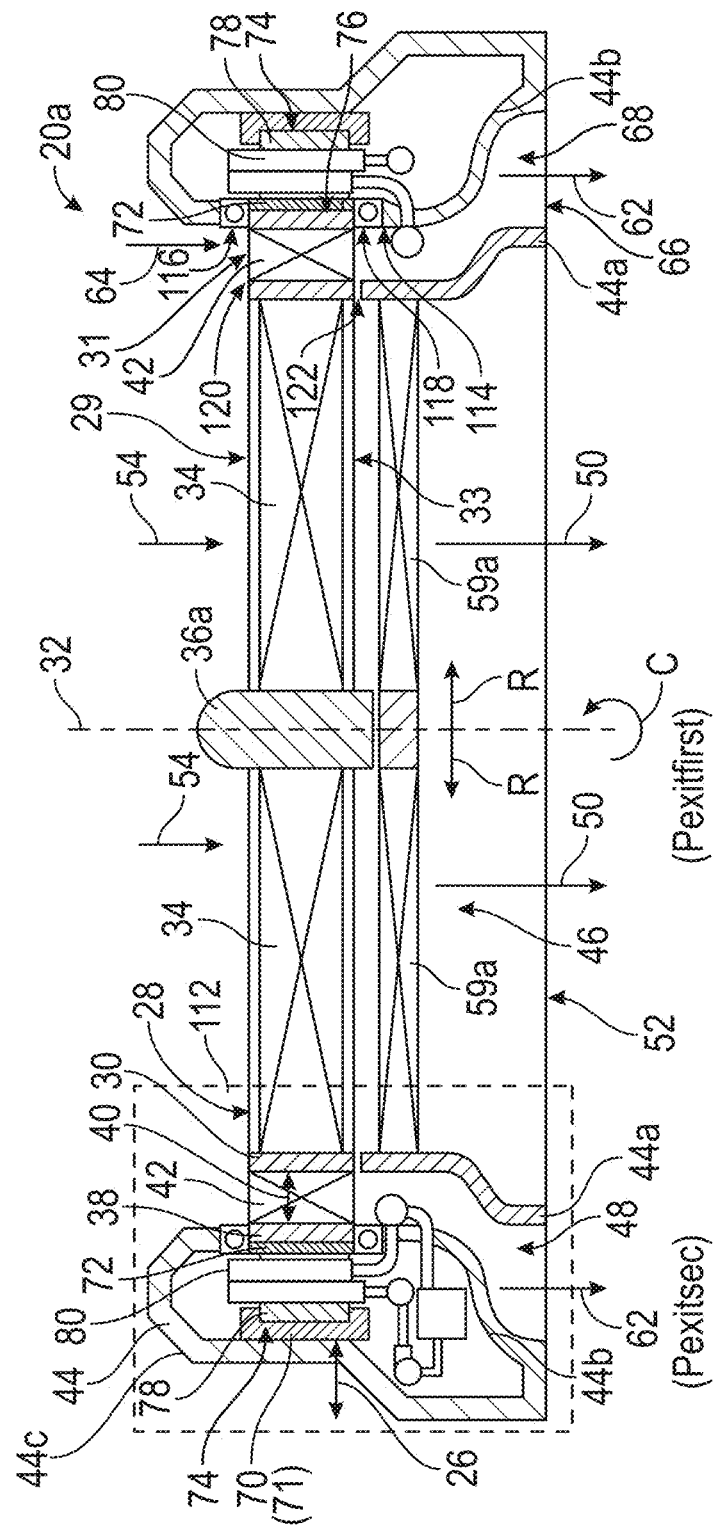
FIG. 9 is a cross-sectional view of an alternate electric propulsion system to that shown in FIG. 2, according to an aspect of the present disclosure.
Figure 10:
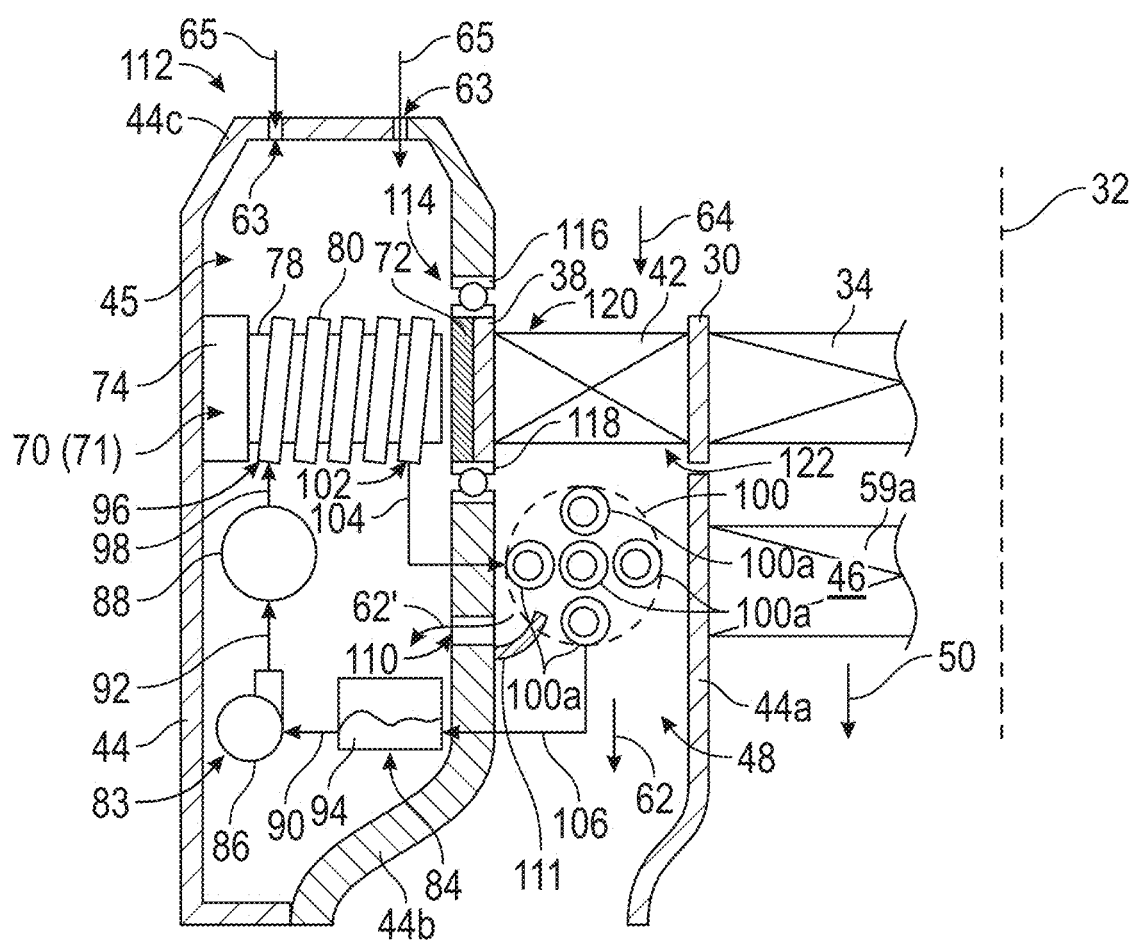
FIG. 10 is a detail view similar to FIG. 5 of a portion of the alternate electric propulsion system taken at detail view 112 of FIG. 9, according to an aspect of the present disclosure.

FIG. 9 is a cross-sectional view of an alternate electric propulsion system 20*a* to that shown in FIG. 2, according to an aspect of the present disclosure. FIG. 10 is a detail view similar to FIG. 5 of a portion of the alternate electric propulsion system 20*a*, taken at detail view 112 of FIG. 9, according to an aspect of the present disclosure. Elements in FIG. 9 and in FIG. 10 that are the same as those in FIG. 2 and in FIG. 5 include the same reference numerals and the description provided above of those same elements applies equally for the FIG. 9 aspect and the FIG. 10 aspect. In the FIG. 9 aspect and the FIG. 10 aspect, however, the alternate electric propulsion system 20*a* omits the support structure 56 and the central shaft 36 with the bearing member 60 to support the central shaft 36 that are included in the FIG. 2 aspect. In the FIG. 9 aspect, the fan rotor assembly 28 includes a central shaft 36*a* and a fan rotor assembly support mechanism 114 that is arranged on the second fan cowling wall 44*b*. Specifically, the fan rotor assembly support mechanism 114 includes a first bearing member 116 arranged on an inlet side 120 of the outer tip-fan wall 38, and a second bearing member 118 arranged on an outlet side 122 of the outer tip-fan wall 38. The first bearing member 116 and the second bearing member 118 limit longitudinal movement of the fan rotor assembly 28 (e.g., axial movement along the fan centerline axis 32) while permitting rotation of the fan rotor assembly 28 about the fan centerline axis 32. Thus, the FIG. 9 aspect and the FIG. 10 aspect provide for a different technique for supporting the fan rotor assembly 28 from that described above for the FIG. 2 aspect and the FIG. 5 aspect. Similar to the FIG. 2 aspect, however, the FIG. 9 aspect may also include a plurality of circumferentially spaced apart stator vanes 59*a* to provide a deswirling to the first flow of air 50.

Figure 11:
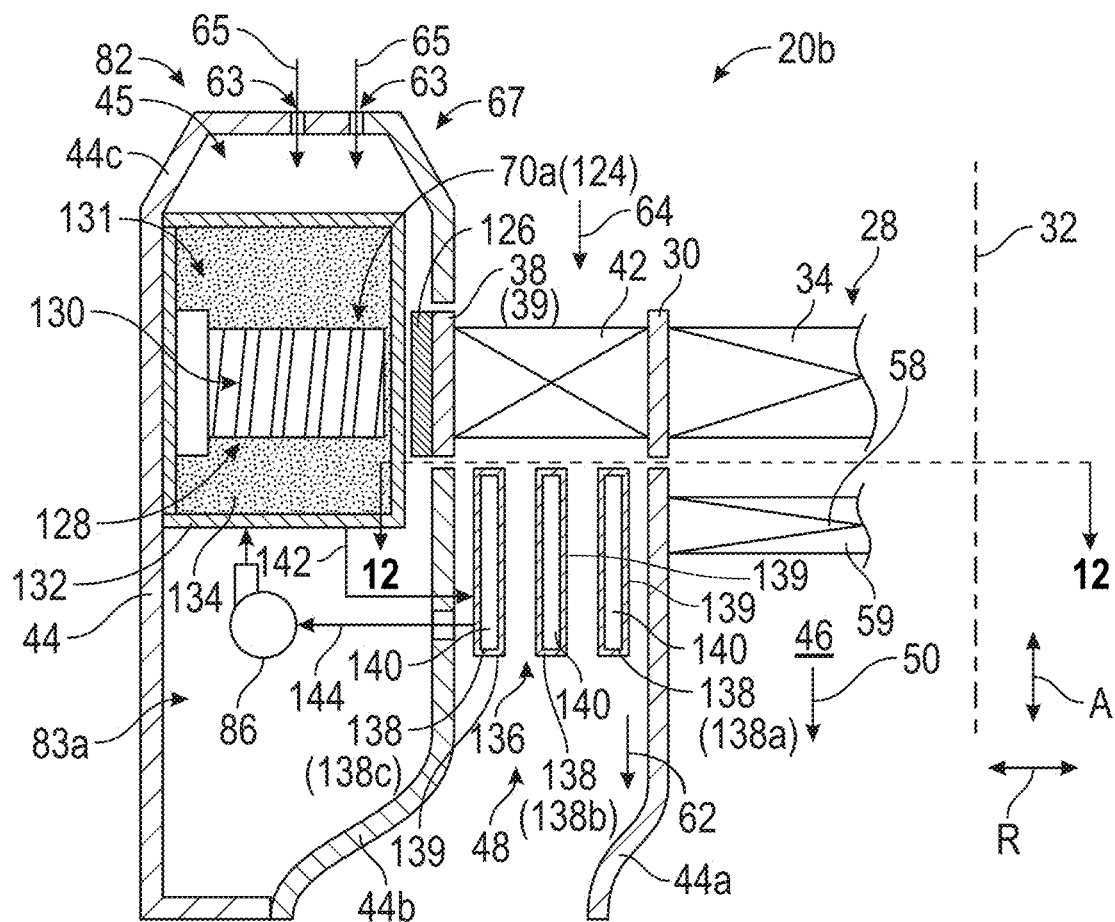
FIG. 11 is a partial, cross-sectional view of a portion of an alternate electric propulsion system to that shown in FIG. 5, according to an aspect of the present disclosure.

FIG. 11 is a partial, cross-sectional view of a portion of an alternate electric propulsion system 20*b* to that shown in FIG. 5, according to an aspect of the present disclosure. Elements in FIG. 11 that are the same as those in FIG. 5 include the same reference numerals and the description provided above of those same elements applies equally for the FIG. 11 aspect. In the FIG. 11 aspect, an alternate electric drive mechanism 70*a* is included rather than the electric drive mechanism 70. The alternate electric drive mechanism 70*a* is shown as a wound field type electric drive system 124. Thus, the fan rotor assembly 28 includes rotor windings 126 at the outer tip-fan wall 38, and a stator assembly 128 includes stator windings (or coils) 130. The rotor windings 126 and the stator windings 130 may be any of series wound, shunt wound, or compound wound. The alternate electric drive mechanism 70*a* drives the fan rotor assembly 28 in a similar manner as described above for the electric drive mechanism 70.

Another difference between the FIG. 11 aspect and the FIG. 5 aspect is that the stator windings 130 may be solid coils rather than being hollow like the coils 80 (FIG. 5). As such, the liquid coolant 94 is not able to flow through the stator windings 130 and another cooling technique is implemented. In FIG. 11, an alternate electric drive cooling system 83*a* implements a flooded cooling system 131 that provides a flooded stator cooling technique in which a stator casing 132 encases the stator assembly 128, and a liquid coolant 134 fills, or at least partially fills, the stator casing 132 so as to surround (or flood) the stator assembly 128 with the liquid coolant 134. The stator casing 132 may extend circumferentially about the fan centerline axis 32. Here, the liquid coolant 134 may be an oil or other any other type of liquid coolant that may be used in a flooded stator arrangement. The stator casing 132 also functions as a liquid coolant reservoir such that the separate coolant reservoir 84 (FIG. 10) does not need to be included. However, the coolant pump 86 may be included to provide for forcing the flow of the liquid coolant 134 through the alternate electric drive cooling system 83*a*, as will be described below.

In the FIG. 11 aspect, another difference is the inclusion of an alternate heat exchanger 136, rather than the heat exchanger 100 of FIG. 5. The alternate heat exchanger 136 may also, however, be implemented in the FIG. 5 aspect in place of the heat exchanger 100. The alternate heat exchanger 136 includes a plurality of plate elements 138, each having a coolant passage 140 therewithin. The heat exchanger 136 includes an inlet 142 that is in fluid communication with the stator casing 132 and is in fluid communication with the alternate heat exchanger 136 to provide a flow of the liquid coolant 134 from the flooded stator casing 132 to the heat exchanger 136. The heat exchanger 136 also includes an outlet 144 that is in fluid communication with the heat exchanger 136 and is in fluid communication with the coolant pump 86 to provide a flow of the liquid coolant 134 from the heat exchanger 136 to the coolant pump 86. As discussed above, the liquid coolant 134 provided to the heat exchanger 136 flows through the coolant passage 140 of each of the plate elements 138, and the second flow of air 62 through the second flow passage 48 provides cooling to the liquid coolant 134 via the thermal exchange between the second flow of air 62 and each of the plate elements 138.

As shown in FIG. 11, each of the plate elements 138 may generally have a rectangular-shaped cross section having a length extending in an axial direction A with respect to the fan centerline axis 32, and a width extending in a radial direction R with respect to the fan centerline axis 32. The rectangular-shaped arrangement of the plate elements 138 provides the ability of the plate elements 138 to also function as guide vanes 139 for the second flow of air 62 through the second flow passage 48. That is, the second flow of air 62 may initially have a swirl or vortex flow induced by the second fan blades 42. The plate elements 138 of the heat exchanger 136 may function as guide vanes to remove or at least reduce the swirl or vortex that is initially induced into the second flow of air 62 such that a more axially-directed flow is induced into the second flow of air 62 passing through the heat exchanger 136.

Figure 12:
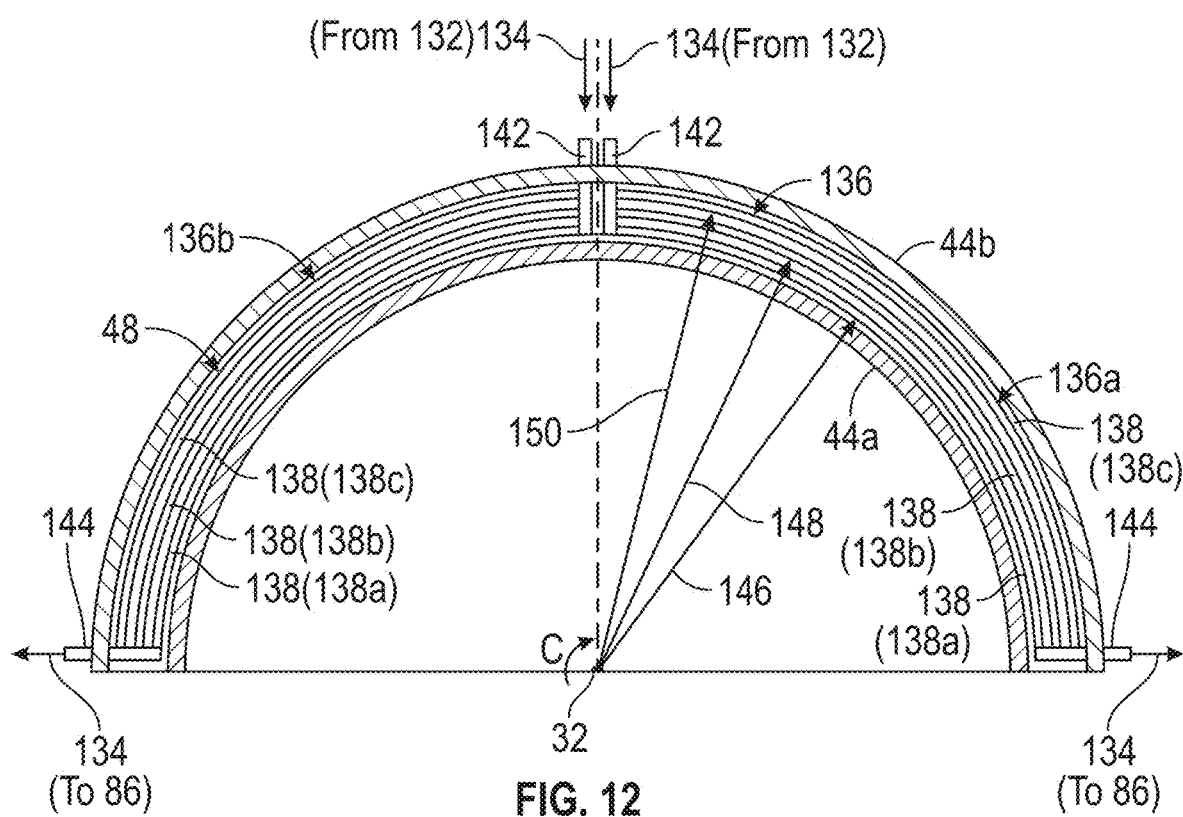
FIG. 12 is a partial, cross-sectional view of a heat exchanger shown in FIG. 11, taken at plane 12-12 of FIG. 11, according to an aspect of the present disclosure.

FIG. 12 is a partial, cross-sectional view of the heat exchanger 136 of FIG. 11, taken at plane 12-12 of FIG. 11, according to an aspect of the present disclosure. FIG. 12 depicts a semi-circumferential arrangement of the heat exchanger 136 about the fan centerline axis 32, but a corresponding semi-circumferential half not depicted in FIG. 12 may be a mirror image of the semi-circumferential half depicted in FIG. 12. In FIG. 12, the alternate heat exchanger 136 may be implemented as a plurality of heat exchanger portions, including a first heat exchanger portion 136a and a second heat exchanger portion 136b. In FIG. 12, the first heat exchanger portion 136a and the second heat exchanger portion 136b extend partially circumferentially about the fan centerline axis 32 within the second flow passage 48. That is, as shown in FIG. 12, the first heat exchanger portion 136a may extend in the circumferential direction C about the fan centerline axis 32 approximately ninety degrees of the total circumference of the second flow passage 48, and the second heat exchanger portion 136b may also extend in the circumferential direction C about the fan centerline axis 32 approximately ninety degrees of the total circumference of the second flow passage 48. Thus, each of the plate elements 138 of the first heat exchanger portion 136a extend in the circumferential direction C, and each of the plate elements 138 of the second heat exchanger portion 136b also extend in the circumferential direction C.

In addition, within each of the first heat exchanger portion 136a and the second heat exchanger portion 136b, the plurality of plate elements are radially spaced apart from each other. For example, a first plate element 138a is arranged within the second passage 48 a first radial distance 146 from the fan centerline axis 32, a second plate element 138b is arranged within the second flow passage 48 a second radial distance 148 from the fan centerline axis 32, the second radial distance 148 being greater than the first radial distance 146, and a third plate element 138c is arranged within the second flow passage 48 a third radial distance 150 from the fan centerline axis, the third radial distance 150 being greater than the second radial distance 148.

In each of the first heat exchanger portion 136a and the second heat exchanger portion 136b, the inlet 142 connects with each of the first plate element 138a, the second plate element 138b, and the third plate element 138c to provide the flow of the liquid coolant 134 to the respective coolant passage 140 of each respective plate element. Similarly, for each of the first heat exchanger portion 136a and the second heat exchanger portion 136b, the outlet 144 connects with each of the first plate element 138a, the second plate element 138b, and the third plate element 138c to receive the flow of the liquid coolant 134 from the respective coolant passage 140 of each respective plate element. The inlet 142 and the outlet 144 of the first heat exchanger portion 136a may be arranged so as to provide a clockwise flow (with respect to the fan centerline axis 32) of the liquid coolant 134 through the first heat exchanger portion 136a, and the inlet 142 and the outlet 144 of the second heat exchanger portion 136b may be arranged to provide a counter-clockwise flow of the liquid coolant 134 through the first heat exchanger portion 136a. Alternatively, the respective inlet 142 and the respective outlet 144 of the first heat exchanger portion 136a and of the second heat exchanger portion 136b can be arranged to provide a same directional flow of the liquid coolant 134 through the first heat exchanger portion 136a and through the second heat exchanger portion 136b (e.g., either both have a clockwise flow or both have a counter-clockwise flow).

Figure 13:
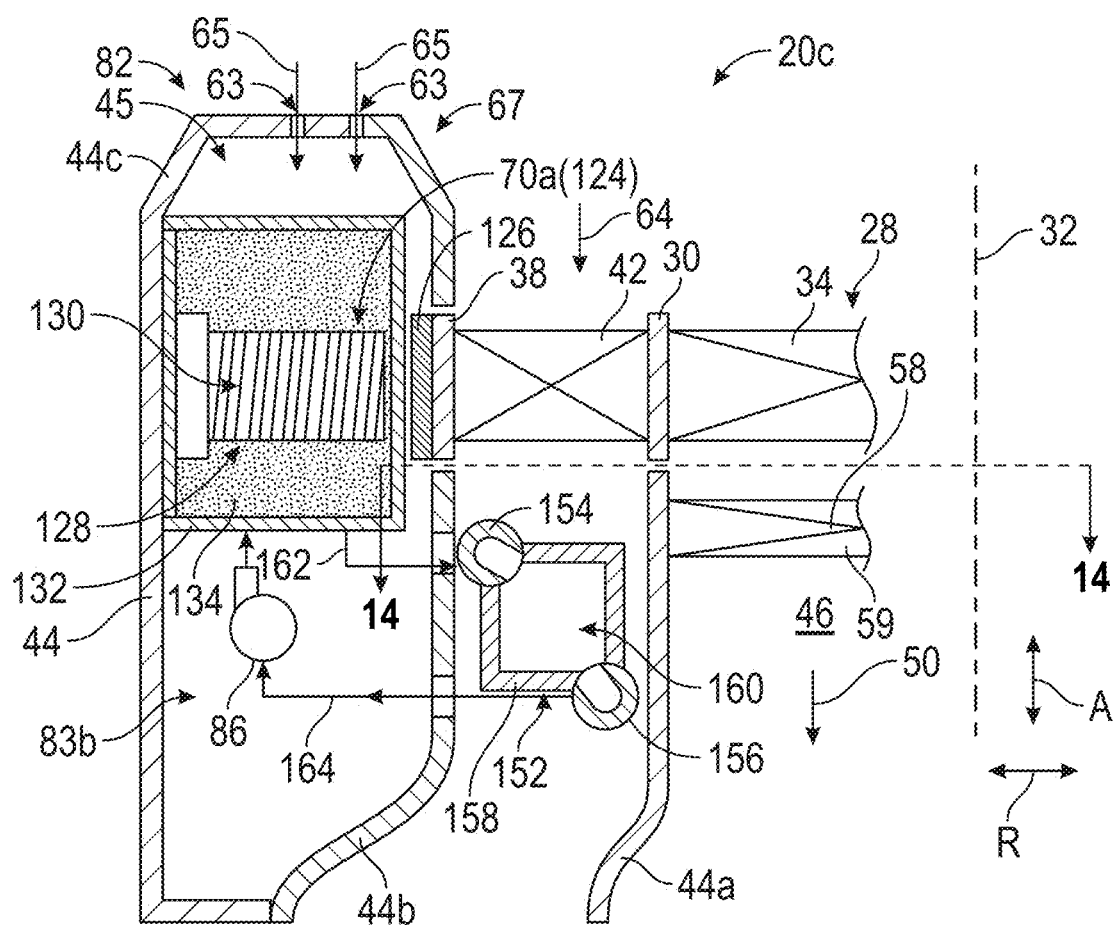
FIG. 13 is a partial, cross-sectional view of a portion of an alternate electric propulsion system to that shown in FIG. 11, according to an aspect of the present disclosure.

FIG. 13 is a partial, cross-sectional view of a portion of an alternate electric propulsion system 20c to that shown in FIG. 11, according to an aspect of the present disclosure. Elements in FIG. 13 that are the same as those in FIG. 11 include the same reference numerals and the description provided above of those same elements applies equally for the FIG. 13 aspect. In the FIG. 13 aspect, an alternate electric drive cooling system 83b includes an alternate heat exchanger 152, that is different from the alternate heat exchanger 136 and that is different from the heat exchanger 100 (FIG. 5), provided within the second flow passage 48. The alternate heat exchanger 152 includes a combination of tubular elements and plate elements, and includes an inlet-side tubular element 154, an outlet-side tubular element 156, and a plurality of plate elements 158 (one shown in FIG. 13). Each of the plurality of plate elements 158 are connected to the inlet-side tubular element 154 and to the outlet-side tubular element 156 and include a coolant passage 160 therewithin. The inlet-side tubular element 154 is in fluid communication with the stator casing 132 to provide a flow of the liquid coolant 134 from the stator casing 132 to the inlet-side tubular element 154. The outlet-side tubular element 156 is in fluid communication with the coolant pump 86 to provide a flow of the liquid coolant 134 from the heat exchanger 152 to the coolant pump 86. Thus, the liquid coolant 134 flows through the inlet-side tubular element 154, through the coolant passage 160 of each of the plurality of plate elements 158, and then through the outlet-side tubular element 156 to the coolant pump 86.

Figure 14:
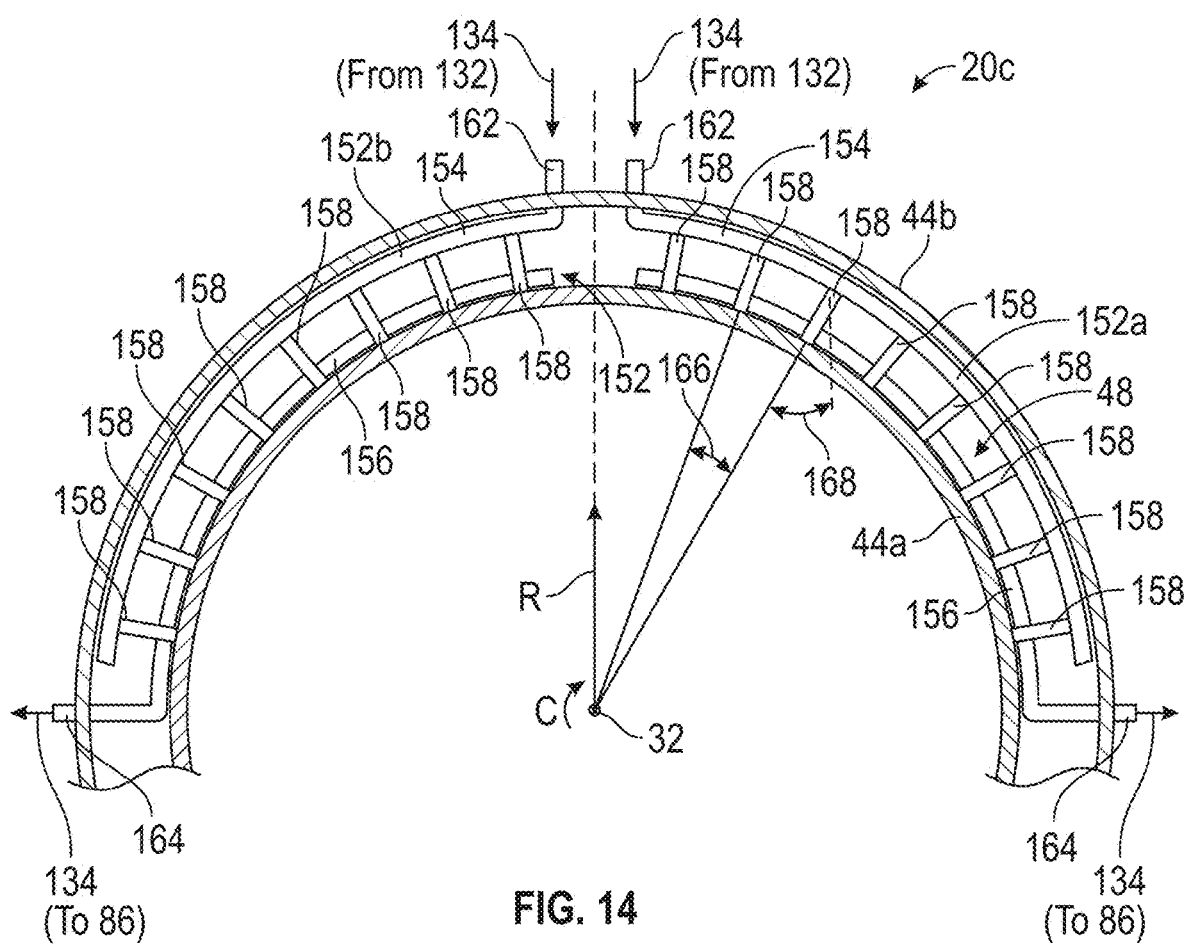
FIG. 14 is a partial, cross-sectional view of a heat exchanger shown in FIG. 13, taken at plane 14-14 of FIG. 13, according to an aspect of the present disclosure.

FIG. 14 is a partial, cross-sectional view of the heat exchanger 152 shown in FIG. 13, taken at plane 14-14 of FIG. 13, according to an aspect of the present disclosure. FIG. 14 depicts a semi-circumferential arrangement of the heat exchanger 152 about the fan centerline axis 32, but a corresponding semi-circumferential half not depicted in FIG. 42 may be a mirror image of the semi-circumferential half depicted in FIG. 14. In FIG. 14, the alternate heat exchanger 152 may be implemented as a plurality of heat exchanger portions, including a first heat exchanger portion 152a and a second heat exchanger portion 152b. In FIG. 14, the first heat exchanger portion 152a and the second heat exchanger portion 152b extend partially circumferentially about the fan centerline axis 32 within the second flow passage 48. That is, as shown in FIG. 14, the first heat exchanger portion 152a may extend in the circumferential direction C about the fan centerline axis 32 approximately ninety degrees of the total circumference of the second flow passage 48, and the second heat exchanger portion 152b may also extend in the circumferential direction C about the fan centerline axis 32 approximately ninety degrees of the total circumference of the second flow passage 48.

In the FIG. 14 aspect, the inlet-side tubular element 154 extends in the circumferential direction C and includes an inlet 162, and the outlet-side tubular element 156 extends in the circumferential direction C and includes an outlet 164. The inlet 162 is in fluid communication with the stator casing 132 to receive a flow of the liquid coolant 134 therefrom and to provide the flow of the liquid coolant 134 to the inlet-side tubular element 154. The outlet 164 is in fluid communication with the coolant pump 86 to provide a flow of the liquid coolant 134 from the outlet-side tubular element 156 to the coolant pump 86. Each of the plate elements 158, as described above, includes the coolant passage 160 through which the liquid coolant 134 flows from the inlet-side tubular element 154 to the outlet-side tubular element 156. As shown in FIG. 14, the direction of the flow of the liquid coolant 134 through the first heat exchanger portion 152a may be in a clockwise direction with respect to the fan centerline axis 32, while the flow of the liquid coolant 134 through the second heat exchanger portion 152b may be in a counterclockwise direction. Alternatively, the respective inlet 162 and the respective outlet 164 of the first heat exchanger portion 152a and of the second heat exchanger portion 152b can be arranged to provide a same directional flow of the liquid coolant 134 through the first heat exchanger portion 152a and through the second heat exchanger portion 152b (e.g., either both have a clockwise flow or both have a counter-clockwise flow).

As shown in FIG. 14, each of the plate elements 158 are generally aligned in a radial direction R with respect to the fan centerline axis 32 and are circumferentially spaced apart by an angular spacing 166. However, one or more of the plate elements 158 may arranged at an angle 168 with respect to the radial direction R. Thus, similar to the plate elements 138 (FIG. 11), the plurality of plate elements 158 can also function as guide vanes for the second flow of air 62 through the second flow passage 48.

Figure 15:
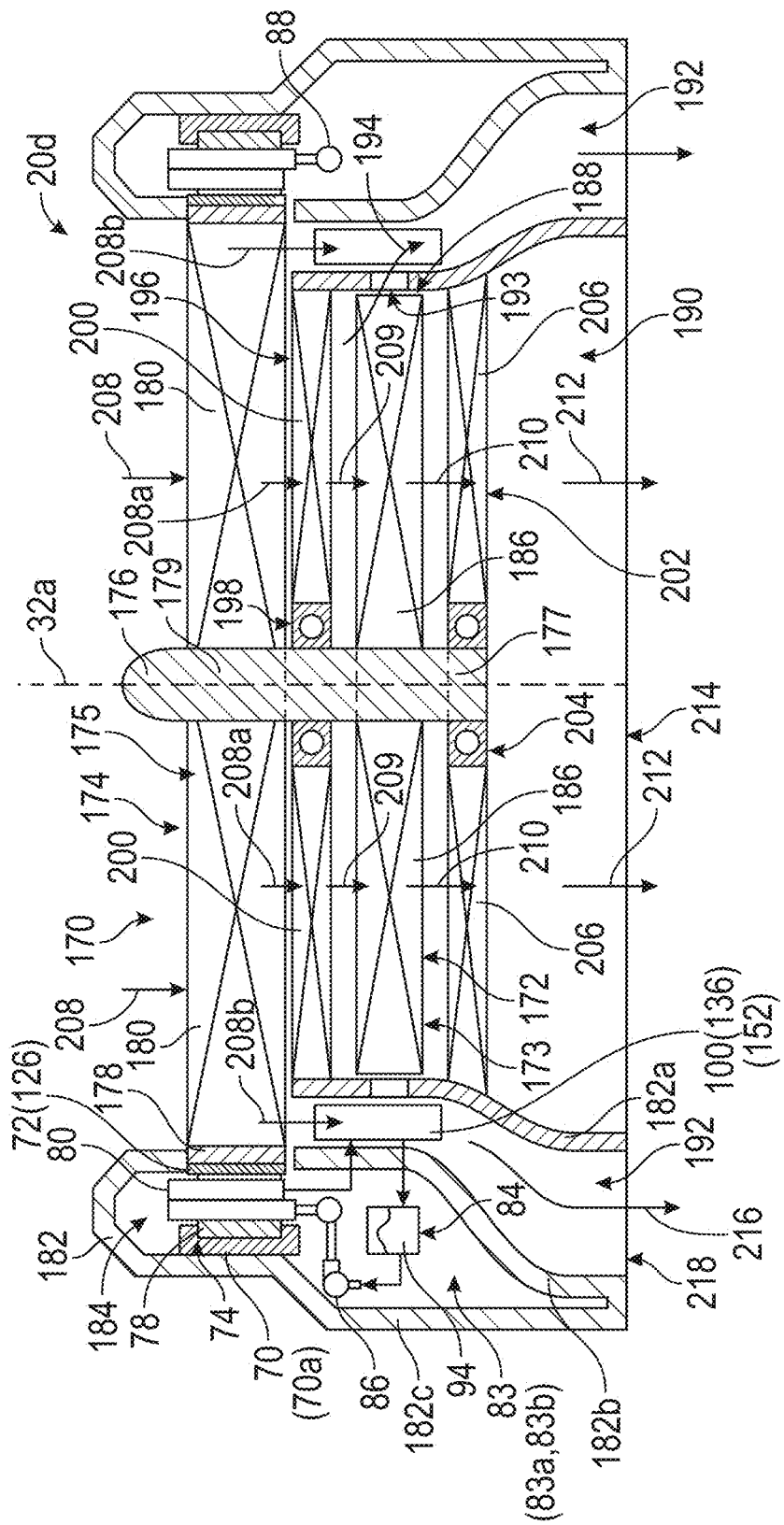
FIG. 15 is a cross-sectional view of an alternate electric propulsion system to that shown in FIG. 2, according to an aspect of the present disclosure.

FIG. 15 is a cross-sectional view of an alternate electric propulsion system 20d to that shown in FIG. 2, according to an aspect of the present disclosure. Elements in FIG. 15 that are the same as those in FIG. 2 include the same reference numerals and the description provided above of those same elements applies equally for the FIG. 15 aspect. The FIG. 15 aspect depicts a multi-stage fan rotor assembly 170 that includes a first fan portion 172 and a second fan portion 174. The first fan portion 172 and the second fan portion 174 are connected to a common central shaft 176, and the multi-stage fan rotor assembly 170 rotates about a fan centerline axis 32a. The second fan portion 174 comprises a second rotor assembly 175 that includes a rotor wall 178 that extends circumferentially about the fan centerline axis 32a, and a plurality of second fan blades 180 (two shown in FIG. 15) that extend from the central shaft 176 to the rotor wall 178 and connect the central shaft 176 and the rotor wall 178. Alternatively, the second rotor assembly 175 may include a second rotor hub 179 (denoted with dashed lines) to which the second fan blades 180 are connected to. The second fan blades 180 may be similar to the first fan blades 34 (FIG. 2, FIG. 3) and are circumferentially spaced apart from one another about the fan centerline axis 32a. The first fan portion 172 includes a first rotor assembly 173 that includes a plurality of first fan blades 186 (two shown in FIG. 15) that are circumferentially spaced apart about the fan centerline axis 32a. The plurality of first fan blades 186 are connected to, and extend radially outward from, the central shaft 176.

Alternatively, the first rotor assembly 173 may include a first rotor hub 177 (denoted with dashed lines) to which the first fan blades 186 are connected to. When the first rotor hub 177 and the second rotor hub 179 are implemented, the first rotor hub 177 and the second rotor hub 179 may be connected to the central shaft 176, such as with a spline-type engagement.

The alternate electric propulsion system 20d of FIG. 15 further includes a fan cowling 182, which is similar to the fan cowling 44 (FIG. 2) and includes a first fan cowling wall 182a, a second fan cowling wall 182b, and a shroud 182c. Similar to the cavity 45 (FIG. 2), a cavity 184 is defined within the shroud 182c and the second fan cowling wall 182b. Similar to the first fan cowling wall 44a (FIG. 2), the first fan cowling wall 182a defines a first flow passage 190 therewithin, and a second flow passage 192 is defined between the first fan cowling wall 182a and the second fan cowling wall 182b. A gap 188 is formed between a tip of the first fan blades 186 and the first fan cowling wall 182a. The first fan cowling wall 182a may also include one or more bleed air passages 193 therethrough to provide a flow of bleed airflow 194 to flow from the first flow passage 190 to the second flow passage 192.

The alternate electric propulsion system 20d further includes a first support structure 196 that has a first bearing member 198 connected to the central shaft 176, and a plurality of circumferentially spaced apart first stator vanes 200 (two shown in FIG. 15) that are connected with the first bearing member 198 and the first fan cowling wall 182a. In addition, a second support structure 202 has a second bearing member 204 that is connected to the central shaft 176, and a plurality of circumferentially spaced apart second stator vanes 206 (two shown in FIG. 15) that are connected with the second bearing member 204 and the first fan cowling wall 182a. Each of the first bearing member 198 and the second bearing member 204 support the central shaft 176 and allow rotation of the multi-stage fan rotor assembly 170 about the fan centerline axis 32a.

The multi-stage fan rotor assembly 170 may be driven by an electric drive mechanism that is similar to, or the same as, either the electric drive mechanism 70 (FIG. 2) or the alternate electric drive mechanism 70a (FIG. 11). For the present aspect, the electric drive mechanism 70 is shown as being included in FIG. 15, and, as such, the plurality of magnets 72 are connected to the rotor wall 178, and the stator assembly 74 is included within a fan cowling 182, which may be similar to the fan cowling 44 (FIG. 2).

The alternate electric propulsion system 20d also includes an electric drive cooling system that may be any of the electric drive cooling system 83 (FIG. 5) with the heat exchanger 100, the alternate electric drive cooling system 83a (FIG. 11) that includes the heat exchanger 136, or the alternate electric drive cooling system 83b (FIG. 13) that includes the heat exchanger 152.

In operation of the alternate electric propulsion system 20d, the multi-stage fan rotor assembly 170 is driven by the electric drive mechanism 70 (or the alternate electric drive mechanism 70a) to rotate the first fan portion 172 and the second fan portion 174 simultaneously about the fan centerline axis 32a. The second fan blades 180 of the second rotor assembly 175 propel an inlet air 208 therethrough. A first portion 208a of the inlet air 208 is propelled by the second fan blades 180 into the first flow passage 190 and a second portion 208b of the inlet air 208 is propelled by the second fan blades 180 into the second flow passage 192. In the first flow passage 190, the first portion 208a is then de-swirled by the first stator vanes 200 and a de-swirled airflow 209 is provided to the first rotor assembly 173. The de-swirled airflow 209 provided to the first rotor assembly 173 is propelled by the first fan blades 186 to generate airflow 210 that is provided to the second stator vanes 206. The airflow 210 flowing through the second stator vanes 206 is de-swirled by the second stator vanes 206, and a first flow of air 212 then flows through an outlet end 214 of the first flow passage 190. The first flow of air 212 may provide a lifting force to the electric propulsion system 20d, similar to the first flow of air 50 (FIG. 2).

In the second flow passage 192, the second portion 208b of the inlet air 208 flows through the heat exchanger 100 (or the heat exchanger 136, or the heat exchanger 152) and provides cooling to the heat exchanger 100 to cool the liquid coolant 94 (or the liquid coolant 134 (FIG. 11)) flowing through the electric drive cooling system 83. As was described above, the heat exchanger 100 (or the heat exchanger 136, or the heat exchanger 152) may function as one or more guide vanes to de-swirl the second portion 208b of the air flowing through the heat exchanger 100, and a second flow of air 216 flows from an outlet end 218 of the second flow passage 192. The second flow of air 216 may be similar to the second flow of air 62 (FIG. 2).

Each of the foregoing aspects provides an electric propulsion system that implements an electric drive cooling system to provide cooling to an electric drive mechanism that drives fan rotor assemblies. A heat exchanger, which is part of the cooling system, is arranged within a dedicated cooling airflow passage, and the fan rotor assemblies are configured to provide a cooling airflow to the cooling airflow passage, while also providing airflow through a main flow passage to provide lift or thrust. The inclusion of the heat exchanger within the flow passage provides for the ability to cool a liquid coolant that is implemented to cool the electric drive mechanism while maintaining an equivalent exit pressure at the outlet ends of the both the main flow passage and the dedicated cooling flow passage. As a result, a more efficient electrical drive system is provided within the electric propulsion system.

Further aspects of the present disclosure are provided by the subject matter of the following clauses.

An electric propulsion system for a flight vehicle, the electric propulsion system including a fan rotor assembly defining a fan centerline axis and having (a) a first fan portion including first fan blades, and (b) a second fan portion including second fan blades, a fan cowling having a first fan cowling wall extending circumferentially about the fan centerline axis and a second fan cowling wall arranged radially outward of the first fan cowling wall, with respect to the fan centerline axis, and extending circumferentially about the fan centerline axis, a first flow passage being defined within the first fan cowling wall, and a second flow passage being defined between the first fan cowling wall and the second fan cowling wall, an electric drive mechanism arranged to drive the fan rotor assembly about the fan centerline axis, and an electric drive cooling system that includes a liquid coolant and arranged to provide cooling to at least a part of the electric drive mechanism, the electric drive cooling system including a heat exchanger arranged within the second flow passage and through which the liquid coolant flows, wherein the first fan portion is arranged to provide a first flow of air through the first flow passage to provide at least one of a lifting force or a thrust force to the electric propulsion system, and the second fan portion is arranged to provide a second flow of air through the second flow passage to provide a flow of cooling air therethrough that is in thermal communication with the heat exchanger.

The electric propulsion system according to the preceding clause, wherein the heat exchanger extends circumferentially within the second flow passage.

The electric propulsion system according to any preceding clause, wherein an outlet end of the second flow passage is arranged as a diffusor flow passage.

The electric propulsion system according to any preceding clause, wherein the heat exchanger is arranged to function as one or more guide vanes to reduce a swirl of the second flow of air induced by the second fan blades.

The electric propulsion system according to any preceding clause, wherein the electric drive mechanism includes a stator assembly arranged within the fan cowling and a rotor driven by the stator assembly arranged on at least one of the first fan portion or the second fan portion.

The electric propulsion system according to any preceding clause, wherein the electric drive mechanism comprises one of a permanent magnet type electric drive system, or a wound field type electric drive system.

The electric propulsion system according to any preceding clause, wherein the stator assembly comprises a plurality of coils and the rotor comprises a plurality of magnets attached to one of the first fan portion or to the second fan portion.

The electric propulsion system according to any preceding clause, wherein each of the plurality of coils includes a coolant flow passage therewithin and is in fluid communication with the heat exchanger to provide a flow of the liquid coolant from the coils to the heat exchanger.

The electric propulsion system according to any preceding clause, wherein the stator assembly includes a flooded cooling system arranged to provide a flow of the liquid coolant to the stator assembly, and that is in fluid communication with the heat exchanger to provide a flow of the liquid coolant from the flooded cooling system to the heat exchanger.

The electric propulsion system according to any preceding clause, wherein the fan rotor assembly comprises a single rotor extending about the fan centerline axis and having an outer tip-fan wall extending circumferentially about the fan centerline axis, an inner tip-fan wall extending circumferentially about the fan centerline axis, and a central shaft extending circumferentially about the fan centerline axis, the first fan portion comprising the central shaft, the inner tip-fan wall, and the first fan blades extending from the central shaft to the inner tip-fan wall, and the second fan portion, arranged radially outward of the first fan portion, comprising the inner tip-fan wall, the outer tip-fan wall, and the second fan blades extending from the inner tip-fan wall to the outer tip-fan wall.

The electric propulsion system according to any preceding clause, wherein the electric drive mechanism includes a stator assembly arranged within the fan cowling radially outward of the second fan cowling wall, and a plurality of magnets arranged circumferentially spaced apart on the outer tip-fan wall.

The electric propulsion system according to any preceding clause, wherein the heat exchanger comprises a plurality of heat exchanger portions, including a first heat exchanger portion and a second heat exchanger portion, each heat exchanger portion extending partially circumferentially within the second flow passage.

The electric propulsion system according to any preceding clause, wherein each heat exchanger portion includes a plurality of plate elements through which the liquid coolant flows, an inlet connected to each of the plurality of plate elements and an outlet connected to each of the plate elements, each of the plurality of plate elements being radially spaced apart from one another with respect to the fan centerline axis within the second flow passage so as to provide for passage of the second flow of air between respective ones of the plurality of plate elements.

The electric propulsion system according to any preceding clause, wherein each heat exchanger portion includes an inlet-side tubular element, an outlet-side tubular element, and a plurality of plate elements each connecting the inlet-side tubular element and the outlet-side tubular element and including a coolant passage therewithin for providing a flow of the liquid coolant from the inlet-side tubular element to the outlet-side tubular element.

The electric propulsion system according to any preceding clause, wherein the fan rotor assembly is a multi-stage fan rotor assembly in which the first fan portion includes a first rotor assembly and the second fan portion includes a second rotor assembly axially spaced apart from the first rotor assembly, the first rotor assembly and the second rotor assembly being connected to a central shaft.

The electric propulsion system according to any preceding clause, wherein the electric drive mechanism is arranged to drive the second rotor assembly.

The electric propulsion system according to any preceding clause, wherein the second rotor assembly provides the second flow of air to the second flow passage and also provides a flow of air to the first flow passage upstream of the first rotor assembly.

The electric propulsion system according to any preceding clause, wherein the fan cowling further includes a shroud, the shroud and the second fan cowling wall defining a cavity, at least a portion of the electric drive mechanism being arranged within the cavity, the second fan cowling wall including at least one cooling passage therethrough providing a flow of a portion of the second flow of air as a cooling airflow from the second flow passage to the cavity.

The electric propulsion system according to any preceding clause, wherein the second fan cowling wall includes at least one deflector arranged on a downstream side of the at least one cooling passage to deflect the flow of the portion of the second flow of air as the cooling airflow through the at least one cooling passage.

The electric propulsion system according to any preceding clause, wherein the shroud includes at least one cooling airflow opening through a first end of the shroud to provide a flow of a cooling airflow therethrough into the cavity.

An electric propulsion system for a flight vehicle, the electric propulsion system including a fan rotor assembly defining a fan centerline axis and having (a) a first fan portion including first fan blades, and (b) a second fan portion including second fan blades, a fan cowling having a first fan cowling wall extending circumferentially about the fan centerline axis and a second fan cowling wall arranged radially outward of the first fan cowling wall, with respect to the fan centerline axis, and extending circumferentially about the fan centerline axis, a first flow passage being defined within the first fan cowling wall, and a second flow passage being defined between the first fan cowling wall and the second fan cowling wall, an electric drive mechanism arranged to drive the fan rotor assembly about the fan centerline axis, and an electric drive cooling system that includes a liquid coolant and arranged to provide cooling to at least a part of the electric drive mechanism, the electric drive cooling system including a heat exchanger arranged within the second flow passage and through which the liquid coolant flows, wherein the first fan portion is arranged to provide a first flow of air through the first flow passage to provide at least one of a lifting force or a thrust force to the electric propulsion system, and the second fan portion is arranged to provide a second flow of air through the second flow passage to provide a flow of cooling air therethrough that is in thermal communication with the heat exchanger, wherein the fan rotor assembly is a multi-stage fan rotor assembly in which the first fan portion includes a first rotor assembly and the second fan portion includes a second rotor assembly axially spaced apart from the first rotor assembly, the first rotor assembly and the second rotor assembly being connected to a central shaft.

The electric propulsion system according to the preceding clause, wherein the heat exchanger extends circumferentially within the second flow passage.

The electric propulsion system according to any preceding clause, wherein an outlet end of the second flow passage is arranged as a diffusor flow passage.

The electric propulsion system according to any preceding clause, wherein the heat exchanger is arranged to function as one or more guide vanes to reduce a swirl of the second flow of air induced by the second fan blades.

The electric propulsion system according to any preceding clause, wherein the electric drive mechanism includes a stator assembly arranged within the fan cowling and a rotor driven by the stator assembly arranged on at least one of the first fan portion or the second fan portion.

The electric propulsion system according to any preceding clause, wherein the electric drive mechanism comprises one of a permanent magnet type electric drive system, or a wound field type electric drive system.

The electric propulsion system according to any preceding clause, wherein the stator assembly comprises a plurality of coils and the rotor comprises a plurality of magnets attached to one of the first fan portion or to the second fan portion.

The electric propulsion system according to any preceding clause, wherein each of the plurality of coils includes a coolant flow passage therewithin and is in fluid communication with the heat exchanger to provide a flow of the liquid coolant from the coils to the heat exchanger.

The electric propulsion system according to any preceding clause, wherein the stator assembly includes a flooded cooling system arranged to provide a flow of the liquid coolant to the stator assembly, and that is in fluid communication with the heat exchanger to provide a flow of the liquid coolant from the flooded cooling system to the heat exchanger.

The electric propulsion system according to any preceding clause, wherein the heat exchanger comprises a plurality of heat exchanger portions, including a first heat exchanger portion and a second heat exchanger portion, each heat exchanger portion extending partially circumferentially within the second flow passage.

The electric propulsion system according to any preceding clause, wherein each heat exchanger portion includes a plurality of plate elements through which the liquid coolant flows, an inlet connected to each of the plurality of plate elements and an outlet connected to each of the plate elements, each of the plurality of plate elements being radially spaced apart from one another with respect to the fan centerline axis within the second flow passage so as to provide for passage of the second flow of air between respective ones of the plurality of plate elements.

The electric propulsion system according to any preceding clause, wherein each heat exchanger portion includes an inlet-side tubular element, an outlet-side tubular element, and a plurality of plate elements each connecting the inlet-side tubular element and the outlet-side tubular element and including a coolant passage therewithin for providing a flow of the liquid coolant from the inlet-side tubular element to the outlet-side tubular element.

The electric propulsion system according to any preceding clause, wherein the electric drive mechanism is arranged to drive the second rotor assembly.

The electric propulsion system according to any preceding clause, wherein the second rotor assembly provides the second flow of air to the second flow passage and also provides a flow of air to the first flow passage upstream of the first rotor assembly.

The electric propulsion system according to any preceding clause, wherein the fan cowling further includes a shroud, the shroud and the second fan cowling wall defining a cavity, at least a portion of the electric drive mechanism being arranged within the cavity, the second fan cowling wall including at least one cooling passage therethrough providing a flow of a portion of the second flow of air as a cooling airflow from the second flow passage to the cavity.

The electric propulsion system according to any preceding clause, wherein the second fan cowling wall includes at least one deflector arranged on a downstream side of the at least one cooling passage to deflect the flow of the portion of the second flow of air as the cooling airflow through the at least one cooling passage.

The electric propulsion system according to any preceding clause, wherein the shroud includes at least one cooling airflow opening through a first end of the shroud to provide a flow of a cooling airflow therethrough into the cavity.

An electric propulsion system for a flight vehicle, the electric propulsion system including a fan rotor assembly defining a fan centerline axis and having (a) a first fan portion including first fan blades, and (b) a second fan portion including second fan blades, a fan cowling having a first fan cowling wall extending circumferentially about the fan centerline axis and a second fan cowling wall arranged radially outward of the first fan cowling wall, with respect to the fan centerline axis, and extending circumferentially about the fan centerline axis, a first flow passage being defined within the first fan cowling wall, and a second flow passage being defined between the first fan cowling wall and the second fan cowling wall, an electric drive mechanism arranged to drive the fan rotor assembly about the fan centerline axis, and an electric drive cooling system that includes a liquid coolant and arranged to provide cooling to at least a part of the electric drive mechanism, the electric drive cooling system including a heat exchanger arranged within the second flow passage and through which the liquid coolant flows, wherein the first fan portion is arranged to provide a first flow of air through the first flow passage to provide at least one of a lifting force or a thrust force to the electric propulsion system, and the second fan portion is arranged to provide a second flow of air through the second flow passage to provide a flow of cooling air therethrough that is in thermal communication with the heat exchanger, wherein the fan rotor assembly comprises a single rotor extending about the fan centerline axis and having an outer tip-fan wall extending circumferentially about the fan centerline axis, an inner tip-fan wall extending circumferentially about the fan centerline axis, and a central shaft extending circumferentially about the fan centerline axis, the first fan portion comprising the central shaft, the inner tip-fan wall, and the first fan blades extending from the central shaft to the inner tip-fan wall, and the second fan portion, arranged radially outward of the first fan portion, comprising the inner tip-fan wall, the outer tip-fan wall, and the second fan blades extending from the inner tip-fan wall to the outer tip-fan wall.

The electric propulsion system according to the preceding clause, wherein the heat exchanger extends circumferentially within the second flow passage.

The electric propulsion system according to any preceding clause, wherein an outlet end of the second flow passage is arranged as a diffusor flow passage.

The electric propulsion system according to any preceding clause, wherein the heat exchanger is arranged to function as one or more guide vanes to reduce a swirl of the second flow of air induced by the second fan blades.

The electric propulsion system according to any preceding clause, wherein the electric drive mechanism includes a stator assembly arranged within the fan cowling and a rotor driven by the stator assembly arranged on at least one of the first fan portion or the second fan portion.

The electric propulsion system according to any preceding clause, wherein the electric drive mechanism comprises one of a permanent magnet type electric drive system, or a wound field type electric drive system.

The electric propulsion system according to any preceding clause, wherein the stator assembly comprises a plurality of coils and the rotor comprises a plurality of magnets attached to one of the first fan portion or to the second fan portion.

The electric propulsion system according to any preceding clause, wherein each of the plurality of coils includes a coolant flow passage therewithin and is in fluid communication with the heat exchanger to provide a flow of the liquid coolant from the coils to the heat exchanger.

The electric propulsion system according to any preceding clause, wherein the stator assembly includes a flooded cooling system arranged to provide a flow of the liquid coolant to the stator assembly, and that is in fluid communication with the heat exchanger to provide a flow of the liquid coolant from the flooded cooling system to the heat exchanger.

The electric propulsion system according to any preceding clause, wherein the electric drive mechanism includes a stator assembly arranged within the fan cowling radially outward of the second fan cowling wall, and a plurality of magnets arranged circumferentially spaced apart on the outer tip-fan wall.

The electric propulsion system according to any preceding clause, wherein the heat exchanger comprises a plurality of heat exchanger portions, including a first heat exchanger portion and a second heat exchanger portion, each heat exchanger portion extending partially circumferentially within the second flow passage.

The electric propulsion system according to any preceding clause, wherein each heat exchanger portion includes a plurality of plate elements through which the liquid coolant flows, an inlet connected to each of the plurality of plate elements and an outlet connected to each of the plate elements, each of the plurality of plate elements being radially spaced apart from one another with respect to the fan centerline axis within the second flow passage so as to provide for passage of the second flow of air between respective ones of the plurality of plate elements.

The electric propulsion system according to any preceding clause, wherein each heat exchanger portion includes an inlet-side tubular element, an outlet-side tubular element, and a plurality of plate elements each connecting the inlet-side tubular element and the outlet-side tubular element and including a coolant passage therewithin for providing a flow of the liquid coolant from the inlet-side tubular element to the outlet-side tubular element.

The electric propulsion system according to any preceding clause, wherein the fan cowling further includes a shroud, the shroud and the second fan cowling wall defining a cavity, at least a portion of the electric drive mechanism being arranged within the cavity, the second fan cowling wall including at least one cooling passage therethrough providing a flow of a portion of the second flow of air as a cooling airflow from the second flow passage to the cavity.

The electric propulsion system according to any preceding clause, wherein the second fan cowling wall includes at least one deflector arranged on a downstream side of the at least one cooling passage to deflect the flow of the portion of the second flow of air as the cooling airflow through the at least one cooling passage.

The electric propulsion system according to any preceding clause, wherein the shroud includes at least one cooling airflow opening through a first end of the shroud to provide a flow of a cooling airflow therethrough into the cavity.

A flight vehicle having an electric propulsion system for providing at least one of a lifting force or a thrust force for propulsion of the flight vehicle, the electric propulsion system including a fan rotor assembly defining a fan centerline axis and having (a) a first fan portion including first fan blades, and (b) a second fan portion including second fan blades, a fan cowling having a first fan cowling wall extending circumferentially about the fan centerline axis and a second fan cowling wall arranged radially outward of the first fan cowling wall, with respect to the fan centerline axis, and extending circumferentially about the fan centerline axis, a first flow passage being defined within the first fan cowling wall, and a second flow passage being defined between the first fan cowling wall and the second fan cowling wall, an electric drive mechanism arranged to drive the fan rotor assembly about the fan centerline axis, and an electric drive cooling system that includes a liquid coolant and arranged to provide cooling to at least a part of the electric drive mechanism, the electric drive cooling system including a heat exchanger arranged within the second flow passage and through which the liquid coolant flows, wherein the first fan portion is arranged to provide a first flow of air through the first flow passage to provide at least one of a lifting force or a thrust force to the electric propulsion system, and the second fan portion is arranged to provide a second flow of air through the second flow passage to provide a flow of cooling air therethrough that is in thermal communication with the heat exchanger.

The flight vehicle according to the preceding clause, wherein the heat exchanger extends circumferentially within the second flow passage.

The flight vehicle according to any preceding clause, wherein an outlet end of the second flow passage is arranged as a diffusor flow passage.

The flight vehicle according to any preceding clause, wherein the heat exchanger is arranged to function as one or more guide vanes to reduce a swirl of the second flow of air induced by the second fan blades.

The flight vehicle according to any preceding clause, wherein the electric drive mechanism includes a stator assembly arranged within the fan cowling and a rotor driven by the stator assembly arranged on at least one of the first fan portion or the second fan portion.

The flight vehicle according to any preceding clause, wherein the electric drive mechanism comprises one of a permanent magnet type electric drive system, or a wound field type electric drive system.

The flight vehicle according to any preceding clause, wherein the stator assembly comprises a plurality of coils and the rotor comprises a plurality of magnets attached to one of the first fan portion or to the second fan portion.

The flight vehicle according to any preceding clause, wherein each of the plurality of coils includes a coolant flow passage therewithin and is in fluid communication with the heat exchanger to provide a flow of the liquid coolant from the coils to the heat exchanger.

The flight vehicle according to any preceding clause, wherein the stator assembly includes a flooded cooling system arranged to provide a flow of the liquid coolant to the stator assembly, and that is in fluid communication with the heat exchanger to provide a flow of the liquid coolant from the flooded cooling system to the heat exchanger.

The flight vehicle according to any preceding clause, wherein the fan rotor assembly comprises a single rotor extending about the fan centerline axis and having an outer tip-fan wall extending circumferentially about the fan centerline axis, an inner tip-fan wall extending circumferentially about the fan centerline axis, and a central shaft extending circumferentially about the fan centerline axis, the first fan portion comprising the central shaft, the inner tip-fan wall, and the first fan blades extending from the central shaft to the inner tip-fan wall, and the second fan portion, arranged radially outward of the first fan portion, comprising the inner tip-fan wall, the outer tip-fan wall, and the second fan blades extending from the inner tip-fan wall to the outer tip-fan wall.

The flight vehicle according to any preceding clause, wherein the electric drive mechanism includes a stator assembly arranged within the fan cowling radially outward of the second fan cowling wall, and a plurality of magnets arranged circumferentially spaced apart on the outer tip-fan wall.

The flight vehicle according to any preceding clause, wherein the heat exchanger comprises a plurality of heat exchanger portions, including a first heat exchanger portion and a second heat exchanger portion, each heat exchanger portion extending partially circumferentially within the second flow passage.

The flight vehicle according to any preceding clause, wherein each heat exchanger portion includes a plurality of plate elements through which the liquid coolant flows, an inlet connected to each of the plurality of plate elements and an outlet connected to each of the plate elements, each of the plurality of plate elements being radially spaced apart from one another with respect to the fan centerline axis within the second flow passage so as to provide for passage of the second flow of air between respective ones of the plurality of plate elements.

The flight vehicle according to any preceding clause, wherein each heat exchanger portion includes an inlet-side tubular element, an outlet-side tubular element, and a plurality of plate elements each connecting the inlet-side tubular element and the outlet-side tubular element and including a coolant passage therewithin for providing a flow of the liquid coolant from the inlet-side tubular element to the outlet-side tubular element.

The flight vehicle according to any preceding clause, wherein the fan rotor assembly is a multi-stage fan rotor assembly in which the first fan portion includes a first rotor assembly and the second fan portion includes a second rotor assembly axially spaced apart from the first rotor assembly, the first rotor assembly and the second rotor assembly being connected to a central shaft.

The flight vehicle according to any preceding clause, wherein the electric drive mechanism is arranged to drive the second rotor assembly.

The flight vehicle according to any preceding clause, wherein the second rotor assembly provides the second flow of air to the second flow passage and also provides a flow of air to the first flow passage upstream of the first rotor assembly.

The flight vehicle according to any preceding clause, wherein the fan cowling further includes a shroud, the shroud and the second fan cowling wall defining a cavity, at least a portion of the electric drive mechanism being arranged within the cavity, the second fan cowling wall including at least one cooling passage therethrough providing a flow of a portion of the second flow of air as a cooling airflow from the second flow passage to the cavity.

The flight vehicle according to any preceding clause, wherein the second fan cowling wall includes at least one deflector arranged on a downstream side of the at least one cooling passage to deflect the flow of the portion of the second flow of air as the cooling airflow through the at least one cooling passage.

The flight vehicle according to any preceding clause, wherein the shroud includes at least one cooling airflow opening through a first end of the shroud to provide a flow of a cooling airflow therethrough into the cavity.

Although the foregoing description is directed to some exemplary embodiments of the present disclosure, other variations and modifications will be apparent to those skilled in the art and may be made without departing from the present disclosure. Moreover, features described in connection with one embodiment of the present disclosure may be used in conjunction with other embodiments, even if not explicitly stated above.

We claim:

1. An electric propulsion system for a flight vehicle, the electric propulsion system comprising:
   a fan rotor assembly defining a fan centerline axis and having (a) a first fan portion including first fan blades, and (b) a second fan portion including second fan blades;
   a fan cowling having a first fan cowling wall extending circumferentially about the fan centerline axis and a second fan cowling wall arranged radially outward of the first fan cowling wall, with respect to the fan centerline axis, and extending circumferentially about the fan centerline axis, a first flow passage defined within the first fan cowling wall, and a second flow passage defined between the first fan cowling wall and the second fan cowling wall;
   an electric drive mechanism arranged to drive the fan rotor assembly about the fan centerline axis; and
   an electric drive cooling system that includes a liquid coolant and arranged to provide cooling to at least a part of the electric drive mechanism, the electric drive cooling system including a heat exchanger arranged within the second flow passage and through which the liquid coolant flows,
   wherein the first fan portion is arranged to provide a first flow of air through the first flow passage to provide at least one of a lifting force or a thrust force to the electric propulsion system, and the second fan portion is arranged to provide a second flow of air through the second flow passage to provide a flow of cooling air therethrough that is in thermal communication with the heat exchanger.

2. The electric propulsion system according to claim 1, wherein the heat exchanger extends circumferentially within the second flow passage.

3. The electric propulsion system according to claim 1, wherein an outlet end of the second flow passage is arranged as a diffusor flow passage.

4. The electric propulsion system according to claim 1, wherein the heat exchanger is arranged to function as one or more guide vanes to reduce a swirl of the second flow of air induced by the second fan blades.

5. The electric propulsion system according to claim 1, wherein the electric drive mechanism includes a stator assembly arranged within the fan cowling and a rotor driven by the stator assembly arranged on at least one of the first fan portion or the second fan portion.

6. The electric propulsion system according to claim 5, wherein the electric drive mechanism comprises one of a permanent magnet type electric drive system, or a wound field type electric drive system.

7. The electric propulsion system according to claim 5, wherein the stator assembly comprises a plurality of coils and the rotor comprises a plurality of magnets attached to one of the first fan portion or to the second fan portion.

8. The electric propulsion system according to claim 7, wherein each of the plurality of coils includes a coolant flow passage therewithin and is in fluid communication with the heat exchanger to provide a flow of the liquid coolant from the coils to the heat exchanger.

9. The electric propulsion system according to claim 7, wherein the stator assembly includes a flooded cooling system arranged to provide a flow of the liquid coolant to the stator assembly, and that is in fluid communication with the heat exchanger to provide a flow of the liquid coolant from the flooded cooling system to the heat exchanger.

10. The electric propulsion system according to claim 1, wherein the fan rotor assembly comprises a single rotor extending about the fan centerline axis and having an outer tip-fan wall extending circumferentially about the fan centerline axis, an inner tip-fan wall extending circumferentially about the fan centerline axis, and a central shaft extending circumferentially about the fan centerline axis, the first fan portion comprising the central shaft, the inner tip-fan wall, and the first fan blades extending from the central shaft to the inner tip-fan wall, and the second fan portion, arranged radially outward of the first fan portion, comprising the inner tip-fan wall, the outer tip-fan wall, and the second fan blades extending from the inner tip-fan wall to the outer tip-fan wall.

11. The electric propulsion system according to claim 10, wherein the electric drive mechanism includes a stator assembly arranged within the fan cowling radially outward of the second fan cowling wall, and a plurality of magnets arranged circumferentially spaced apart on the outer tip-fan wall.

12. The electric propulsion system according to claim 1, wherein the heat exchanger comprises a plurality of heat exchanger portions, including a first heat exchanger portion and a second heat exchanger portion, each heat exchanger portion extending partially circumferentially within the second flow passage.

13. The electric propulsion system according to claim 12, wherein each heat exchanger portion includes a plurality of plate elements through which the liquid coolant flows, an inlet connected to each of the plurality of plate elements and an outlet connected to each of the plate elements, each of the plurality of plate elements being radially spaced apart from one another with respect to the fan centerline axis within the second flow passage so as to provide for passage of the second flow of air between respective ones of the plurality of plate elements.

14. The electric propulsion system according to claim 12, wherein each heat exchanger portion includes an inlet-side tubular element, an outlet-side tubular element, and a plurality of plate elements each connecting the inlet-side tubular element and the outlet-side tubular element and including a coolant passage therewithin for providing a flow of the liquid coolant from the inlet-side tubular element to the outlet-side tubular element.

15. The electric propulsion system according to claim 1, wherein the fan rotor assembly is a multi-stage fan rotor assembly in which the first fan portion includes a first rotor assembly and the second fan portion includes a second rotor assembly axially spaced apart from the first rotor assembly, the first rotor assembly and the second rotor assembly being connected to a central shaft.

16. The electric propulsion system according to claim 15, wherein the electric drive mechanism is arranged to drive the second rotor assembly.

17. The electric propulsion system according to claim 15, wherein the second rotor assembly provides the second flow of air to the second flow passage and also provides a flow of air to the first flow passage upstream of the first rotor assembly.

18. The electric propulsion system according to claim 1, wherein the fan cowling further includes a shroud, the shroud and the second fan cowling wall defining a cavity, at least a portion of the electric drive mechanism being arranged within the cavity, the second fan cowling wall including at least one cooling passage therethrough providing a flow of a portion of the second flow of air as a cooling airflow from the second flow passage to the cavity.

19. The electric propulsion system according to claim 18, wherein the second fan cowling wall includes at least one deflector arranged on a downstream side of the at least one cooling passage to deflect the flow of the portion of the second flow of air as the cooling airflow through the at least one cooling passage.

20. The electric propulsion system according to claim 18, wherein the shroud includes at least one cooling airflow opening through a first end of the shroud to provide a flow of a cooling airflow therethrough into the cavity.

* * * * *